(12) United States Patent
Pfeffer

(10) Patent No.: US 8,314,683 B2
(45) Date of Patent: Nov. 20, 2012

(54) INCIDENT RESPONSE SYSTEM

(75) Inventor: Anshel Pfeffer, Jerusalem (IL)

(73) Assignee: The Israelife Foundation, Jerusalem (IL)

( * ) Notice: Subject to any disclaimer, the term of this patent is extended or adjusted under 35 U.S.C. 154(b) by 612 days.

(21) Appl. No.: 12/430,259

(22) Filed: Apr. 27, 2009

(65) Prior Publication Data
US 2009/0284348 A1 Nov. 19, 2009

Related U.S. Application Data

(60) Provisional application No. 61/051,843, filed on May 9, 2008.

(51) Int. Cl.
G08B 5/22 (2006.01)
G08B 1/08 (2006.01)
H04M 11/04 (2006.01)
(52) U.S. Cl. .............. 340/7.3; 340/539.13; 340/572.1; 455/404.2; 455/456.1
(58) Field of Classification Search .......... 340/7.1–7.53, 340/539.11, 825.49; 455/456.1, 404.2; 342/450, 342/357.07
See application file for complete search history.

(56) References Cited

U.S. PATENT DOCUMENTS

| | | | |
|---|---|---|---|
| 5,960,337 A | 9/1999 | Brewster et al. | |
| 6,281,834 B1 | 8/2001 | Stilp | |
| 7,091,852 B2 * | 8/2006 | Mason et al. | 340/539.13 |
| 7,177,623 B2 | 2/2007 | Baldwin | |
| 7,233,781 B2 | 6/2007 | Hunter et al. | |
| 7,245,216 B2 * | 7/2007 | Burkley et al. | 340/539.13 |
| 2005/0264412 A1 | 12/2005 | Levesque et al. | |
| 2007/0030144 A1 | 2/2007 | Titus et al. | |
| 2007/0041514 A1 | 2/2007 | Rodkey et al. | |
| 2007/0083409 A1 | 4/2007 | Dilbeck et al. | |
| 2007/0103292 A1 * | 5/2007 | Burkley et al. | 340/539.13 |
| 2007/0103294 A1 | 5/2007 | Bonecutter et al. | |
| 2007/0126573 A1 | 6/2007 | Valania | |
| 2007/0275690 A1 | 11/2007 | Hunter et al. | |
| 2007/0280462 A1 | 12/2007 | Neece | |
| 2009/0140851 A1 * | 6/2009 | Graves et al. | 340/539.12 |

OTHER PUBLICATIONS

International Search Report and Written Opinion for PCT/IB2009/05508 dated Sep. 29, 2009.
International Preliminary Report on Patentability received for PCT/IB2009/005508 issued Nov. 9, 2010.

* cited by examiner

*Primary Examiner* — Daniel Wu
*Assistant Examiner* — Mancil Littlejohn
(74) *Attorney, Agent, or Firm* — Eitan Mehulal & Sadot

(57) ABSTRACT

A method for responding to incidents includes receiving incident information corresponding to an incident at an incident location. An incident scenario is generated based at least in part on the incident information, where the incident scenario identifies a number of responders for responding to the incident. A responder is identified based at least in part on an incident effectiveness of the responder with respect to the incident, where the incident effectiveness is based at least in part on past performance of the responder. A request for assistance with the incident is sent to a mobile device of the responder.

19 Claims, 13 Drawing Sheets

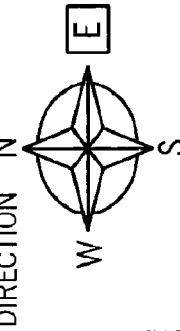

FIG. 8A

| ASSESTS DISPATCHED | | | | | | | | | |
|---|---|---|---|---|---|---|---|---|---|
| | STATUS | NAME | TEAM | QUALIFICATION | TRANSPORT | DISPATCH TIME | LAST POS. | ETA | END |
| AUTO | ◇ | JOHN SMITH 050-5441253 | BROOKLINE | ALS | 🚶 | 00:02 | 00:00:05 | 00:00 | ⊗ |
| AUTO | ◇ | JOHN SMITH 050-5441253 | BROOKLINE | ALS | 🏍 | 00:02 | 00:00:11 | 00:00 | ⊗ |
| AUTO | ◇ | JOHN SMITH 050-5441253 | NEWTON | BLS | 4x4 | 00:02 | 00:00:20 | 00:00 | ⊗ |
| AUTO | ◇ | JOHN SMITH 050-5441253 | BROOKLINE | EXTRICALTION | 4x4 | 00:02 | 00:00:21 | 00:00 | ⊗ |
| AUTO | ◉ | JOHN SMITH 050-5441253 | NEWTON | BLS | 🚶 | 00:02 | 00:00:42 | 01:43 | ⊗ |
| AUTO | ↩ | JOHN SMITH 050-5441253 | NEWTON | BLS | 🚗 | 00:02 | 01:34:21 | 04:21 | ⊗ |

DISPATCH

| QUALIFICATION | REQ. | AVA. | EQUIPMENT | REQ. | AVA. | AUTO DISPATCH ENGINE |
|---|---|---|---|---|---|---|
| ▽ | | 5 | ▽ | | 12 | ○ DURATION |
| ▽ | | 12 | | | | ○ MAX ETA |
| ADD | | | ADD | | | UPDATE DISPATCH |

AUTO / MANUAL

800

INCIDENT RESPONSE SYSTEM

CROSS-REFERENCE TO RELATED APPLICATIONS

This application claims the benefit of U.S. Provisional Patent Application Ser. No. 61/051,843 filed May 9, 2008, the entire disclosure of which is incorporated by reference.

FIELD

The subject of the disclosure relates generally to an incident system. More specifically, the disclosure relates to a system, method, device, and computer-readable medium for identifying, analyzing, and responding to incidents through task assignments. The disclosure further relates to command, control, and monitoring of the incidents to ensure that the task assignments are performed, and evaluation and analysis of response performance upon conclusion of the incidents.

BACKGROUND

Each day, thousands of emergency and other situations arise in which one or more individuals require assistance. Emergency situations can include medical situations, car accidents, airplane accidents, bombings, fires, natural disasters, etc. In many regions throughout the world, teams of responders are notified of emergency situations such that they can provide assistance to the individuals in need. These teams of responders can include emergency medical technicians, firefighters, police officers, hazmat crews, volunteers, military personnel, etc. The responders are generally notified of the emergency situation from a dispatcher that receives a distress call. For example, in the United States, 911 call centers receive calls regarding emergency situations and provide the relevant information to an appropriate response team.

The inventors have perceived that current response systems are limited by their inability to dispatch a real time response to an emergency situation where the response is based on the most accessible, relevant, and available resources of a plurality of agencies and individuals. The inventors have also perceived that current response systems are limited by their inability to incorporate real time information into the response plan and/or to modify the response plan based on real time information. The inventors have also perceived that current response systems are limited by their inability to provide real time tracking and monitoring of all individuals and equipment responding to the situation, regardless of the affiliation of the individuals and equipment. The inventors have further perceived that current response systems are limited by their inability to coordinate the dispatch of multiple agencies for extreme emergencies that are spread out over large areas and/or involve numerous victims.

The inventors have also perceived that current response systems are limited by their inability to provide dispatchers and commanders with an up-to-date view of all assets dispatched in response to a situation, regardless of the affiliation of the dispatcher/commander or the communication networks used by the dispatcher/commander. The inventors have further perceived that current response systems are limited by their inability to provide a method for analyzing and evaluating the performance of individuals responding to situations, and using the evaluation to immediately impact how the individuals are dispatched to subsequent situations.

SUMMARY

An exemplary method for responding to incidents is provided. The method includes receiving incident information corresponding to an incident at an incident location. An incident scenario is generated based at least in part on the incident information, where the incident scenario identifies a number of responders for responding to the incident such that an optimal response is provided. A responder is identified based at least in part on an incidence effectiveness of the responder. The incident effectiveness may be based on a number of factors, including a current location of the responder, training of the responder, accreditations of the responder, experience of the responder, past performance of the responder, a mode of transportation of the responder, and/or equipment at the disposal of the responder. A request for assistance is sent to a mobile device of the responder. The request for assistance can include incident information corresponding to the incident.

An exemplary task management system includes a central server, a scenario analysis engine, and a dispatch engine. The central server is configured to communicate with a plurality of mobile devices. The scenario analysis engine is in communication with the central server, and is configured to generate an incident scenario based at least in part on received incident information corresponding to an incident at an incident location. The incident scenario identifies a number of responders for responding to the incident such that an optimal response is provided. The dispatch engine is in communication with the central server, and is configured to identify a responder based at least in part on an incident effectiveness of the responder. The incident effectiveness can be based on a current location of the responder, training of the responder, accreditations of the responder, experience of the responder, past experience of the responder, a mode of transportation of the responder, and/or equipment at the disposal of the responder. The dispatch engine is also configured to send a request for assistance with the incident to a mobile device of the responder.

Another exemplary method for responding to incidents is provided. The method includes receiving incident information corresponding to an incident at an incident location. A number of responders for responding to the incident are identified. A responder queue including a plurality of responders is generated, where the plurality of responders are included based at least in part on an incident effectiveness of each of the plurality of responders, where the incident effectiveness is based at least in part on experience of each of the plurality of responders and locations of each of the plurality of responders relative to the incident location. A request for assistance with the incident is sent to the number of responders at a top of the responder queue.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

FIG. 6B is a screen shot of a route/junction entry screen of a location details module in accordance with an exemplary embodiment.

FIG. 6C is a screen shot of a site entry screen of the location details module in accordance with an exemplary embodiment.

FIG. 8A is a screen shot of a dispatched assets search and modification screen of the dispatcher interface in accordance with an exemplary embodiment.

DETAILED DESCRIPTION

Figure 1:
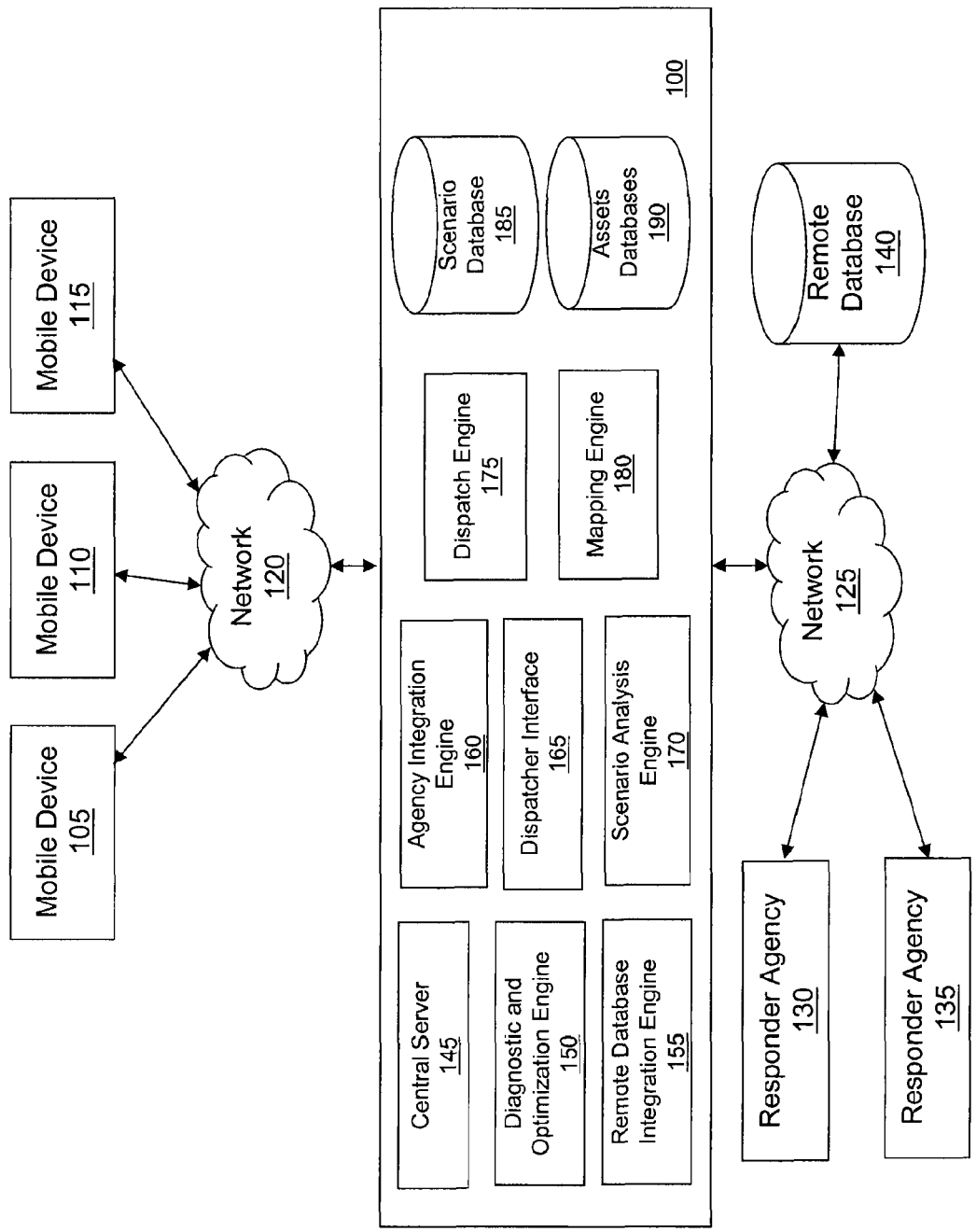
FIG. 1 is a block diagram illustrating a task management network including a task management system in accordance with an exemplary embodiment.

FIG. 1 is a block diagram illustrating a task management network including a task management system 100 in accordance with an exemplary embodiment. In broad terms, task management system 100 can be configured to identify incidents, develop one or more incident scenarios to resolve the incidents, and implement the one or more incident scenarios by assigning tasks to one or more responders through dispatch requests. An incident can refer to any event for which it is desirable to have the assistance of a responder. Exemplary incidents can include emergencies (such as car accidents, airplane accidents, boating accidents, terrorist attacks, medical emergencies, natural disasters, etc.), sporting event crowd control and monitoring, concert crowd control and monitoring, military operations, training operations, work crew allocation, roadside assistance, field technician dispatch (i.e., power company repairmen, telephone company repairmen, appliance repairmen, etc.), delivery services, surveillance, reality gaming, etc. A responder can refer to any individual or entity that is registered or otherwise associated with task management system 100 for the purpose of receiving tasks. Throughout this description, task management system 100 is described with reference to an emergency responder responding to an emergency incident. However, it is to be understood that task management system 100 is not limited to emergency responses, but rather can be used to assign tasks to assist in a wide range of incidents as described above.

Task management system 100 is in communication with a mobile device 105, a mobile device 110, and a mobile device 115 through a network 120. In an exemplary embodiment, network 120 can be a telecommunications network. Alternatively, any other communication network(s) known to those of skill in the art may be used. Mobile devices 105, 110, and 115 can be cellular telephones, paging devices, personal digital assistants (PDAs), tablet personal computers (PCs), portable gaming devices, laptop computers, dedicated task management system devices, or any other type of communication devices known to those skilled in the art. An exemplary mobile device is described in more detail with reference to FIG. 3. In an exemplary embodiment, mobile device 105 can be used by a first responder, mobile device 110 can be used by a second responder, and mobile device 115 can be used by a third responder. In alternative embodiments, task management system 100 may be in communication with additional or fewer mobile devices through network 120, a network 125, and/or additional networks. For example, task management system 100 may be in communication with hundreds, thousands, etc. of mobile devices through one or a plurality of communication networks. Interaction of task management system 100 with mobile devices 105, 110, and 115 is described in more detail below.

Task management system 100 is also in communication with a responder agency 130 and a responder agency 135 through network 125. Network 125 can be the Internet, a local area network, a wide area network, a wireless fidelity (Wi-Fi) network, a telecommunications network, or any other communication network known to those of skill in the art. In one embodiment, network 120 and network 125 may be the same network. Responder agencies 130 and 135 can be any agencies or associations which are affiliated in some way with one or more responders. For example, responder agency 130 may be a police department in which one or more of the police officers are responders. Responder agencies 130 and 135 can also be military departments, fire departments, volunteer associations, governmental agencies, etc. In alternative embodiments, task management system 100 may be in communication with additional or fewer responder agencies. Interaction of task management system 100 with responder agencies 130 and 135 is described in more detail below.

Task management system 100 is also in communication with a remote database 140 through network 125. Remote database 140 can be any source which can convey information to task management system 100. For example, remote database 140 may be a patient medical history repository for providing responders with up-to-date medical conditions of individuals in need of assistance. Remote database 140 can also be a satellite database that provides overview images of an incident location, a mapping database that provides maps of the incident location, a hazmat database with information regarding chemicals and/or chemical spills, a toxic poisons database, an informational database with medical treatment information, a traffic database that provides stored and/or up-to-date information regarding traffic at and around the incident location, a criminal records database, a mental health records database, a blueprint database that provides blueprints of buildings at or near the incident location, etc. In alternative embodiments, task management system 100 may be in communication with additional or fewer remote databases. Interaction of task management system 100 with remote database 140 is described in more detail below.

Task management system 100 includes a central server 145, a diagnostic and optimization engine 150, a remote database integration engine 155, an agency integration engine 160, a dispatcher interface 165, a scenario analysis engine 170, a dispatch engine 175, a mapping engine 180, a scenario database 185, and assets databases 190. In alternative embodiments, task management system 100 may include additional, fewer, and/or different components. As used herein, an engine can refer to any combination of software and/or hardware that is configured to perform one or more tasks. Task management system 100 can also include one or more processors for facilitating interaction between the engines and databases of task management system 100 and for executing algorithms implemented by the various engines of task management system 100. In an exemplary embodiment, the components of task management system 100 can be in direct communication with one another. Alternatively, one or more of the components may be located remote from task management system 100. The components of task management system 100 are described below as having various functions and properties. This is not meant to be limiting, and it is to be understood that in alternative embodiments, any component of task management system 100 may perform functions of and/or have properties of any other component(s).

Central server 145 can include a customized operating system that enables communication with a plurality of different mobile devices through a plurality of different networks. For example, mobile device 105 may be a first type of cellular phone with first capabilities, mobile device 110 may be a second type of cellular phone with second capabilities, and mobile device 115 may be a personal digital assistant with third capabilities. Central server 145 can facilitate optimal communication with mobile devices 105, 110, and 115 based on their specific capabilities. The specific capabilities can include hardware installed on the mobile devices, software installed on the mobile devices, location tracking capabilities of the mobile devices, etc. As an example, mobile device 105 may have a global positioning system (GPS) antenna allowing mobile device 105 to continuously be tracked with a small margin of error. Mobile device 110 may not have a GPS antenna, but may be configured for network-based location identification through triangulation or other such methods offered through network 120. Mobile device 115 may not have a GPS antenna or the ability to use network-based location identification, but may be associated with one or more predefined, fixed positions identified by a responder associated with mobile device 115 (i.e., through a text message, through a network browser, etc.). Regardless of these differences, central server 145 can communicate with each of mobile devices 105, 110, and 115 regarding their location. As another example, mobile device 105 may not be able to receive image data and mobile device 115 may be capable of receiving image data and video data. If an image of an incident location is available, central server 145 can be used to ensure that the image is sent to mobile device 115 and that no attempt is made to send the image to mobile device 105. In the alternative, a textual or audio description of the image may be sent to mobile device 105.

Diagnostic and optimization engine 150 can be used to automatically monitor task management system 100 and diagnose problems with task management system 100. Diagnostic and optimization engine 150 can also be used to identify any problems with backup power systems used by task management system 100 such as batteries, fuel cells, generators, micro-sources, etc. Any service outages and other network problems can also be identified by diagnostic and optimization engine 150. Diagnostic and optimization engine 150 can further be used to diagnose communication and/or software problems with remote entities such as mobile devices 105, 110, and 115, responder agencies 130 and 135, and/or remote database 140. In one embodiment, diagnostic and optimization engine 150 can be used to intelligently maximize battery life for global positioning system (GPS) enabled mobile devices by controlling a number of GPS information messages transmitted by the mobile devices. Alternatively, task management software installed on the mobile devices may be used alone or in conjunction with diagnostic and optimization engine 150 to maximize battery life. Maximizing battery life for GPS-enabled mobile devices is described in more detail with reference to FIG. 3.

Remote database integration engine 155 can be used to communicate with remote databases. For example, remote database integration engine 155 may be configured to scan available remote databases for any information relevant to an identified incident. As an example, an identified incident may be a fire in an office building, and remote database 140 can be a blueprints database. Remote database integration engine 155 can access remote database 140 to obtain blueprints of the building which is on fire. Central server 145 can be used to provide the blueprints to the mobile devices of any responders who are en route to the incident. Similarly, an identified incident may be a hazardous waste spill. Remote database integration engine 155 can access a hazmat database to obtain information regarding containment and clean up of the hazardous waste such that the obtained information can be provided to responders who have been dispatched with containment and/or clean up tasks. Remote database integration engine 155 can also access a poisons database to obtain information regarding treatment of individuals who have inhaled or come into contact with the hazardous waste such that the obtained information can be provided to responders who have been dispatched with medical treatment tasks. Remote database integration engine 155 may be configured to automatically interact with remote databases based on a description and/or categorization of an identified incident. Alternatively, or in addition, a dispatcher can manually control remote database integration engine 155 to locate specific information.

Agency integration engine 160 can be used to communicate with responder agencies. Task management system 100 can communicate with responder agencies to obtain information regarding responders, to provide responder agencies with incident information, to request additional assistance for an incident, to provide post-incident reporting information to the responder agencies, etc. As an example, an individual who claims to be affiliated with responder agency 130 may attempt to register him/herself as a responder. Agency integration engine 160 can interact with responder agency 130 to verify the identity, personal information, and/or claimed certifications and accolades of the individual. Responder verification is described in more detail with reference to FIG. 2. Agency interaction engine 160 can also interact with responder agency 130 regarding any policies of agency interaction engine 160. An exemplary policy may relate to permission for responders associated with responder agency 130 to be contacted for responding to incidents involving a plurality of agencies. Interaction between agency integration engine 160 and responder agencies can be automatic, manually implemented, or both, depending on the embodiment.

In an exemplary embodiment, central server 145 can receive information regarding an incident. The incident information can be received from any source through any method, including a telephone call, an e-mail, a text message, a satellite image, a voice message, a coded message, a distress signal from a responder, a witness message from a responder, etc. Receipt of incident information is described in more detail with reference to FIG. 5. In one embodiment, upon receipt of the incident information, a dispatcher can manually enter the incident information into dispatcher interface 165. Dispatcher interface 165, which is described in more detail with reference to FIGS. 5-8, can be an interface through which the dispatcher can communicate with task management system 100. Dispatcher interface 165 can be used to convey the incident information to scenario analysis engine 170. Alternatively, received incident information may be automatically provided to scenario analysis engine 170.

In an exemplary embodiment, based on the incident information, scenario analysis engine 170 can be used to generate an incident scenario. The incident scenario can be a detailed response plan for responding to the incident. The incident scenario can include an optimal number of responders, an identification of desired skill sets of the responders, desired equipment, contingency plans in case the desired responders, skill sets, equipment, etc. are unavailable, and any other information which can contribute to providing an optimal response to the incident. The incident scenario may also identify a maximum arrival time of responders. In one embodiment, responders may be considered effective (or relevant) for responding to an incident if they are estimated to be able to reach the incident location within the maximum arrival time. For example, the incident scenario may indicate a maximum arrival time of twelve minutes for an incident which is urgent in nature. As such, any responders for which an estimated time of arrival to the incident location exceeds twelve minutes may not (at least initially) be asked to respond to the incident. Scenario analysis engine 170 can interact with scenario database 185 to generate the incident scenario.

Scenario database 185 can include pre-programmed optimal responses based on incident information such as type of incident, location of incident, time of day, time of year, current weather, whether the incident occurred on a holiday, the number of persons involved in the incident, the equipment needed to deal with the incident, etc. In an exemplary embodiment, scenario database 185 can be fully customizable based on the experience and knowledge of agencies, businesses, etc. using task management system 100. For example, each agency in communication with task management system 100 can identify an appropriate response to a given incident (i.e. how many and what type of responders and assets to dispatch). The agency can access scenario database 185 through an administrative website (or by any other method), and manually adjust the response levels for each type of incident as the agency sees appropriate. In the case of incidents involving multiple agencies, the administration function of scenario database 185 can allow each agency to decide on what resources they are willing to allocate to the incident.

In an exemplary embodiment, scenario analysis engine 170 can continually update scenario database 185 based on the experiences of task management system 100 in dealing with previous incidents and/or current trends in incidents. For example, the incident scenario for a prior incident may have indicated that eight responders would be able to provide an optimal response. However, after responding to the incident, reports may indicate that eight responders was not enough to efficiently and effectively deal with the incident. Based on this information, scenario analysis engine 170 can update scenario database 185 to ensure that the incident scenario for a subsequent incident (similar in scope to the prior incident) recommends nine or more responders.

Scenario analysis engine 170 can also be used to update the incident scenario based on subsequently received incident information. For example, the initial incident information may be from a passerby and may indicate a car crash involving two adults. A first responder to arrive at the scene may realize that car crash actually involves the two adults and two children in the back seat, and also that the car is on fire. The first responder can use his/her mobile device to provide this additional information to task management system 100, and scenario analysis engine 170 can update the incident scenario accordingly. Alternatively, or in addition, a dispatch based on the incident scenario may be updated by task management system 100 and/or the dispatcher. As an example, the updated incident scenario or dispatch may include additional responders to help with the additional passengers, and additional responders equipped to deal with the fire.

In an exemplary embodiment, dispatch engine 175 can receive the incident scenario from scenario analysis engine 170 and generate a dispatch based on the incident scenario. Dispatch engine 175 can be used to ensure that a maximized amount of the desired resources are provided to deal with the incident. Dispatch engine 175 can interact with mapping engine 180 and/or assets databases 190 to generate the dispatch. Dispatch engine 175 can use mapping engine 180 to identify the locations of responders relative to a location of the incident (i.e., incident location). In one embodiment, dispatch engine 175 can identify a geographic area surrounding an incident location from which responders will be requested. Alternatively, the area can be a predetermined range, such as x square kilometers from the incident location. Mapping engine 180, which can be part of a comprehensive geographic information system, can have numerous functions, including providing directions to responders, identifying alternate routes based on traffic or weather, providing aerial photographs, identifying topography, etc.

Assets databases 190 can include a responder database, an equipment database, a mobile device database, a permissions database, and/or any other databases including relevant information for generating the dispatch. Assets databases 190 may also include any informational databases such as those described above as remote databases. In alternative embodiments, the information stored in assets databases 190 can be combined into a single database. Dispatch engine 175 can use the permissions database to determine the permissions and capabilities of agencies, responders, and dispatchers associated with task management system 100. Dispatch engine 175 can interact with the responder database to identify responders (who are known to be in the incident area based on information received from mapping engine 180) who have the needed skill sets, qualifications, and/or equipment to respond to the incident. The responder database can include a responder profile for each responder as described in more detail with reference to FIG. 2.

Dispatch engine 175 can rank identified responders into one or more responder queues based on an incident effectiveness (or relevance) of the identified responder with respect to a particular incident. In an exemplary embodiment, a responder queue can be generated for each type of responder identified in the incident scenario. The incident effectiveness can be specific to each incident, and can be based on a plurality of factors, including an amount of time it will take the responder to travel to the incident location. The responder database can include information regarding the responder's mode of transportation (i.e., bicycle, foot, motorcycle, scooter, vehicle, four wheel drive vehicle, public transportation, etc.), and dispatch engine 175 can use the mode of transportation information along with the current location of the responder and any other known factors (i.e., bad weather, bad traffic, rush hour, etc.) to determine the amount of time it should take the responder to arrive at the incident location.

The incident effectiveness of the responder can also be based on past experience of the responder, past performance of the responder in responding to incidents, and/or any other information included in the responder profile of the responder. For example, a responder who has never responded to an incident, who has performed poorly during previous incidents, or who has just received a medical certification, may be ranked lower than a responder who has responded to numerous incidents, who has performed well during previous incidents, or who has been medically certified for several years. The incident effectiveness of the responder can also be based on the likelihood that the responder will accept the dispatch request. For example, responders who routinely ignore or refuse to accept dispatch requests may have a lower incident effectiveness and be ranked lower than responders who routinely accept all dispatch requests. The incident effectiveness of the responder can further be based on the equipment in the possession of or accessible by the responder. The equipment in possession of the responder can be stored in the responder database and/or the equipment database. In alternative embodiments, any other factors may be used to determine the incident effectiveness for ranking the identified responders into one or more responder queues.

Dispatch engine 175 can use the mobile device database within assets databases 190 to identify the mobile devices associated with identified responders such that the dispatch can be sent to the proper responders. Dispatch engine 175 can use mapping engine 180, the responder database, and/or the equipment database to identify desired equipment which is located in the geographic area surrounding the incident location. Based on the location of the equipment, the amount of time it will take for the equipment to arrive at the incident location, the likelihood that the equipment is available, the last time the equipment was serviced or checked, the expiration date of the equipment (if relevant), and any other factors, dispatch engine 175 can generate a ranked equipment queue similar to the responder queue. In alternative embodiments, the equipment queue may be combined with the responder queue because in many instances the responders may possess the desired equipment. Alternatively, large equipment such as the 'Jaws of Life' (i.e., a hydraulic rescue tool) or a fire truck may not be in the possession of an individual responder.

Once dispatch engine 175 has generated the responder queue(s) and/or the equipment queue(s), dispatch engine 175 can cause central server 145 to send out the dispatch. In an exemplary embodiment, the dispatch can initially be sent to a first number x responders in a responder queue, where the number x is a number of optimal responders identified in the incident scenario and corresponding to the particular responder queue. Based on the responses or lack of responses from responders, dispatch engine 175 can move down the responder queue until the optimal number of responders is en route to the incident location. An exemplary algorithm for determining when and how to move down the responder queue(s) is described in more detail with reference to FIG. 5. A similar process can be used for providing the dispatch to individuals, responders, and entities who have equipment listed in the equipment queue(s). Exemplary operations performed by an exemplary task management system in response to an identified incident are described in more detail with reference to FIG. 5.

Figure 2:
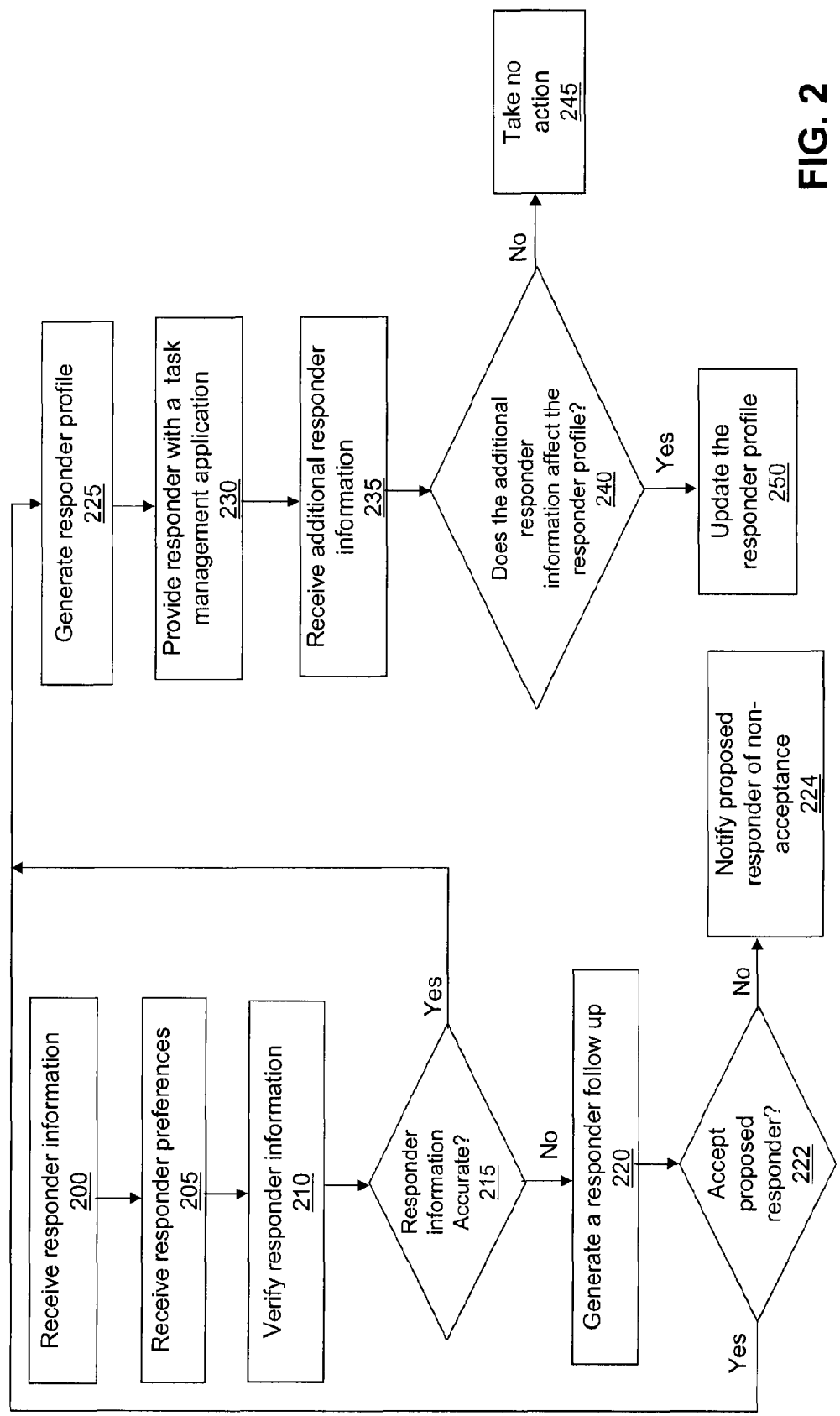
FIG. 2 is a flow diagram illustrating operations for registering a responder in accordance with an exemplary embodiment.

FIG. 2 is a flow diagram illustrating operations for registering a responder in accordance with an exemplary embodiment. In alternative embodiments, additional, fewer, and/or different operations may be performed. In an operation 200, responder information is received. The responder information may be received directly from the potential responder through a network browser on a mobile device, a desktop computer, etc. The responder information may also be received directly from the potential responder over the telephone, in an e-mail, or by any other method. In an alternative embodiment, the responder information may be received from an agency with which the potential responder is associated. For example, the responder information may correspond to a new hire at a fire department.

The responder information can include the proposed responder's name, address, citizenship, telephone number, social security or other identification number, and/or any other personal information The responder information can also include information regarding the medical history of the proposed responder, the vaccination record of the proposed responder, the criminal record of the proposed responder, the skills of the proposed responder, the certifications of the proposed responder, the experience of the proposed responder, the employment history of the proposed responder, the education of the proposed responder, the mode(s) of transportation used by the proposed responder, etc. The responder information can also include an identification of any agencies with which the proposed responder is associated or would like to be associated. As an example, the proposed responder may be registered with a fire fighting agency and in the process of registering with a policing agency and a hazmat agency. If the proposed responder is accepted as a responder, he/she may only be placed in responder queues for fire fighting tasks until his/her registration is approved by the policing agency and/or the hazmat agency. Upon registration with the policing agency and the hazmat agency, the responder may also be placed in responder queues related to policing tasks and hazmat tasks, respectively. The responder information can further include information regarding the make, model, functionality, etc. of the mobile device owned by the proposed responder and any mobile device carriers used by the proposed responder. If the proposed responder does not have a mobile device, a dedicated responder mobile device may be provided to the proposed responder upon acceptance as a responder. In an alternative embodiment, all responders may be provided with a dedicated responder mobile device regardless of whether the responders have their own mobile device.

In an operation 205, responder preferences of the proposed responder are received. The responder preferences may be received along with or independent of the responder information, depending on the embodiment. The responder preferences can include the time(s) of day which the proposed responder is able and willing to act as a responder and the days of the week which the proposed responder is able and willing to act as a responder. The responder preferences can also include any locations in which the proposed responder would prefer to act as a responder, any types of incidents in which the proposed responder refuses to act as a responder, any relevant fears of the proposed responder, and/or whether the proposed responder would prefer to receive urgency messages if the task management system is unable to obtain an optimal number of responders for a given incident. For example, an obstetrician may use responder preferences to indicate that he/she is only willing to respond to incidents which i) are within x kilometers of his/her current location, ii) involve a woman in labor outside of a hospital, and iii) involve a high probability that the woman will give birth prior to arriving at the hospital.

In an operation 210, the responder information is verified. The responder information can be verified by contacting an agency with which the proposed responder claims to be associated. The responder information can also be verified by contacting agencies, associations, etc. from which the proposed responder claims to have received degrees, certifications, training, etc. The responder information can further be verified by accessing post office records, governmental records, etc. In one embodiment, the responder information can be automatically verified by the task management system. Alternatively, the responder information may be manually verified by a dispatcher or other individual associated with the task management system.

In an operation 215, a determination is made regarding whether the responder information is accurate. The determination can be based on a computer algorithm which weighs and combines verification responses to generate an overall verification score for the proposed responder. If the overall verification score exceeds a predetermined threshold, the verification can be considered successful. Alternatively, the verification can be done manually or by any other method. If the verification is not successful (i.e., there is some doubt as to the proposed responder's credentials, identity, etc.), a responder follow up is generated in an operation 220. The responder follow up can include follow up questions posed to the proposed responder and/or a request for different types of information. The responder follow up can also include contacting the proper authorities to report a potentially fraudulent attempt to gain entry into the task management system. In an operation 222, a determination is made regarding whether to accept the proposed responder based on the results of the responder follow up. If the proposed responder is not accepted, the proposed responder is notified of the non-acceptance in an operation 224.

If the verification is successful (i.e., the proposed responder's identity, credentials, etc. appears to be accurate) or if the responder follow up indicates that the proposed responder is an acceptable candidate, a responder profile for the proposed responder is generated in an operation 225. The responder profile can include the proposed responder's name, home address, work address, mobile device characteristics and capabilities, skills, abilities, qualifications, an identification of equipment in possession of the responder and/or accessible by the responder, location(s) of the identified equipment, mode(s) of transportation, an identification of agencies or other organizations (i.e., fire department, policing agency, etc.) with which the responder is registered, an identification of the responder's roles within any registered agencies or other organizations (i.e., ambulance driver, ambulance repair man, etc.), and/or any other information regarding the responder which can be used by a dispatch engine to generate a dispatch in response to an incident. The responder profile can also include responder preferences and any other important information which may affect the proposed responder's ability to respond to an incident. For example, if the proposed responder has a fear of heights, this information can be included in the responder profile such that the responder is not dispatched to help with an incident which occurs on scaffolding of an eighty story high rise building.

In an operation 230, once approved, the proposed responder is provided with a task management application for installation on a mobile device of the proposed responder. The task management application provided to the proposed responder can be customized based on characteristics of the proposed responder, the environment in which the proposed responder lives/works, the agencies with which the proposed responder is associated, the responsibilities of the proposed responder, the mobile device of the proposed responder, etc. The task management application can be provided to the proposed responder through a telecommunications network, through the Internet, via a compact disc, via a memory card, through a Bluetooth connection, through a Corn serial port connection, through a universal serial bus (USB) connection, or by any other method known to those of skill in the art. The task management application can allow the proposed responder to receive dispatch requests to assist with incidents, receive directions to incidents, provide information to the task management system regarding incidents, and to otherwise interact with the task management system. The task management application is described in more detail with reference to FIGS. 3-4. Upon receipt and successful installation of the task management application, the proposed responder can be considered a responder.

In an alternative embodiment, or if the proposed responder does not have a mobile device, the proposed responder may be provided with a dedicated mobile device that includes the task management application. In another alternative embodiment, the proposed responder may be provided with the task management application prior to providing the responder information and/or responder preferences. As such, the proposed responder can enter the responder information and/or the responder preferences using the task management application.

In an operation 235, additional responder information is received. The additional responder information can be received from any source and can include any information regarding the responder's performance and/or abilities to perform as a responder. For example, the additional responder information may be a notice from an agency that the responder's medical certification has expired and needs to be renewed. The additional responder information may include the frequency with which the responder accepts, ignores, and declines dispatch requests. The additional responder information may also include reports from other responders or individuals present at incidents regarding the responder's actions and performances during the incidents. The additional responder information can also be updated information from the responder such as purchasing of a new mobile device, purchasing of a new vehicle, a change in address, a change in phone number, a new qualification obtained, etc.

In an operation 240, a determination is made regarding whether the additional responder information affects the responder profile. If the additional responder information does not affect the responder profile, no action is taken in an operation 245. If the additional responder information affects the responder profile, the responder profile is updated in an operation 250. As such, the dispatch engine has up-to-date information regarding the responder. The dispatch engine can use this up-to-date information in the responder profile in part to generate an incident effectiveness for use in determining where the responder is to be ranked in a responder queue in the event of an incident. The dispatch engine can also use this information to assign a level of authority to the responder. The level of authority can be a level of trust used to determine how much the task management system relies on reports, incident information, etc. received from the responder. For example, a responder who routinely submits incorrect reports may have a lower level of authority and trust than an error free responder.

Figure 3:
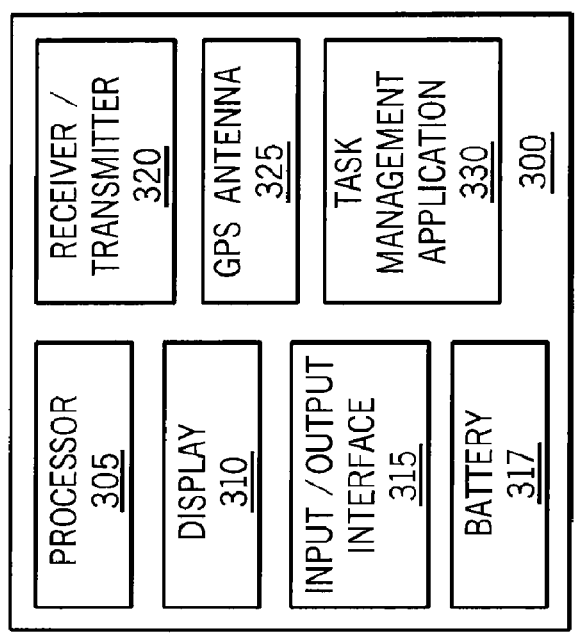
FIG. 3 is a block diagram illustrating a mobile device in accordance with an exemplary embodiment.

FIG. 3 is a block diagram illustrating a mobile device 300 in accordance with an exemplary embodiment. Mobile device 300 includes a processor 305, a display 310, an input/output (I/O) interface 315, a battery 317, a receiver/transmitter 320, a global positioning system (GPS) antenna 325, and a task management application 330. In alternative embodiments, mobile device 300 may include additional, fewer, and/or different components. In an exemplary embodiment, processor 305 can be used to facilitate interaction and execution of the components of mobile device 300. Display 310 can be a liquid crystal display (LCD) or any other type of electronic visual display known to those of skill in the art. Display 310 can be used to provide the responder with visual information, including dispatch requests and incident information. Input/output interface 315 can include a microphone, a touch screen, a keyboard, a speaker, or any other component which allows a responder to interact with mobile device 300. Battery 317 can be any type of battery configured to provide electrical power to mobile device 300. Receiver/transmitter 320 can include a cellular antenna or receiver, a transmitter, a transceiver, and/or any receiving/transmitting algorithms which allow mobile device 300 to communicate through a communications network.

Global positioning system (GPS) antenna 325 can be used to communicate with one or more GPS satellites. GPS antenna 325, which may be internal or external, can be used to transmit/receive signals such that a precise location of mobile device 300 can be determined using triangulation or any other GPS algorithm known to those of skill in the art. The location of mobile device 300 can be provided to the task management system on a regular or irregular interval such that the dispatch engine can identify responders in the vicinity of an incident location. In one embodiment, a responder may identify times during the day in which location monitoring of his/her mobile device is to be disabled. This information can be provided to task management application 330 through responder interface 315. Alternatively, such information may be included in the responder preferences described with reference to FIG. 2.

In an exemplary embodiment, task management application 330 can include a GPS transmission regulator that is configured to control the frequency with which responder location is transmitted to the task management system. Task management application 330 may also include a GPS antenna regulator configured to control the amount which GPS antenna 325 is active in attempting to determine current coordinates of mobile device 300. Both the GPS transmission regulator and the GPS antenna regulator can be configured to conserve the life of battery 317 of mobile station 300 by controlling the number and/or frequency of location-related transmissions and/or activation of GPS antenna 325. The GPS transmission regulator can also be used to reduce data transmission quantity and costs. The GPS transmission regulator can control a number and/or frequency of location requests which are received from the task management system and/or a number and/or frequency of location determinations which are transmitted to the task management system. The GPS transmission regulator can control the location-related transmissions based on responder preferences. The GPS antenna regulator can control the number and/or frequency of location determinations made using GPS antenna 325. Both the GPS transmission regulator and the GPS antenna regulator can be configured to control the location-related transmissions based on learned or provided responder behaviors and tendencies.

As an example, the GPS transmission regulator can transmit the position of mobile device 300 once every x number of minutes if mobile device 300 has been immobile for a predetermined period of time, once every y number of seconds if mobile device 300 is on the move, and once every z number of seconds if mobile device 300 is en route to an incident location. In an exemplary embodiment, the GPS antenna regulator can learn the movements of the responder associated with mobile device 300, and based on past movements can project future movements. Based on the projected future movements, the GPS antenna regulator can adjust the frequency of activation of GPS antenna 325 (or other network-based positioning algorithms). For example, if the responder has not moved more than n meters in the past hour, the GPS antenna regulator may cause GPS antenna 325 to turn on only once every m minutes. The frequency can be increased if the responder has moved more than n meters in the past hour.

In one embodiment the GPS transmission regulator and/or the GPS antenna regulator can learn that the responder is at the same location (i.e., place of employment) from 9:00 am to 5:00 pm virtually every work day. As such, the GPS transmission regulator can reduce the frequency of location-related transmissions during this time period because there is a high likelihood that the responder is at his/her place of employment. Similarly, the GPS transmission regulator and/or the GPS antenna regulator can identify that the responder occasionally leaves his/her place of employment between 12:00 pm and 1:00 pm (i.e., lunch break). As such, the GPS transmission regulator can increase the frequency of location-related transmissions between 12:00 pm and 1:00 pm on work days. The GPS transmission regulator can also adjust the frequency of location-related transmissions if it is determined that the responder is virtually always at the same location (i.e., his/her home) between the hours of 9:00 pm and 8:00 am on nights preceding work days. In an alternative embodiment, the GPS transmission regulator may be implemented in whole or in part at the task management system, and mobile device 300 may not include the GPS transmission regulator or may include a limited GPS transmission regulator.

In one embodiment, mobile device 300 may also include assisted-GPS (A-GPS) functionality such that the location of mobile device 300 can potentially be determined while the responder is inside a building or in any other area in which GPS location may be non-functional or inaccurate. Any A-GPS algorithms known to those of skill in the art may be used. If the mobile device of a responder is not GPS-enabled, the responder can be asked to enter pre-defined location information such as home address, work address, etc. such that the task management system can have an approximation of the responder's whereabouts. The responder may also be asked for his/her location at any given time. The responder may also pre-program a plurality of locations (i.e., locations 1-9) such that the responder can rapidly indicate to which location he/she is nearest. If GPS service is lost or a responder can no longer be tracked, the task management system may operate under the assumption that the responder is at the last tracked or last reported location.

Task management application 330 can also provide the responder with a responder interface. The responder interface can include one or more screens which are used as the interface through which the responder receives information from and provides information to the task management system. For example, a responder can use the responder interface to update his/her responder profile, to update his/her responder preferences, to provide information regarding an incident at which he/she is present, to request additional help and/or equipment at an incident, to report an incident as a witness, to send out a distress signal, to provide reporting information after assisting with an incident, to remotely activate or de-activate equipment, etc. The task management system can use the responder interface to provide dispatch requests to the responder, to provide incident updates to the responder, to request information from the responder, etc. The responder interface can be customizable (i.e., text size, color, layout, information displayed, font type, etc.) based on the preferences of the responder.

Figure 4A:
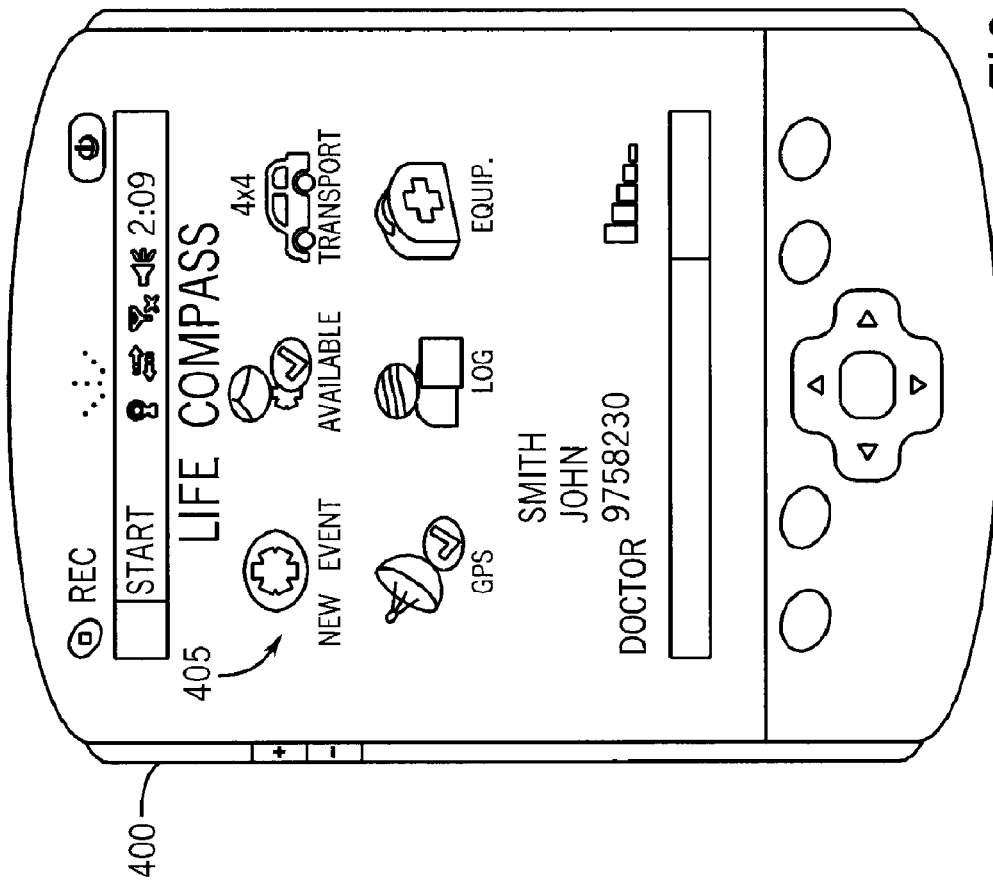
FIG. 4A illustrates a mobile device with a first responder interface screen in accordance with an exemplary embodiment.

FIG. 4A illustrates a mobile device 400 with a first responder interface screen 405 in accordance with an exemplary embodiment. First responder interface screen 405 includes exemplary positional and movement information of the responder, including a longitudinal coordinate, a latitudinal coordinate, altitude, speed, address, and mode of transportation. First responder interface screen 405 also includes several exemplary icons which can provide information and/or allow the responder to navigate to additional responder interface screens. For example, a new event icon can allow the responder to report an incident as a witness. If the responder comes across an incident as he/she is traveling, etc., the responder can enter all known relevant information for provision to the task management system. Upon activation of the new event icon, the responder can be presented with a plurality of predefined incident choices that he/she is witnessing (i.e., heart attack, car accident, etc.) The task management system can use this information to generate a dispatch if appropriate. Upon reporting the incident, the responder can automatically be considered to have been dispatched to the incident. Otherwise, the incident can be handled like any other dispatcher initiated incident as described below. As described in more detail with reference to FIG. 4E, responders can also initiate incidents using a distress signal.

An availability icon indicates the responder's present status and may allow the responder change his/her status. For example, the responder may indicate that he/she does not wish to respond to incidents by setting the status to unavailable. Alternatively, the responder, for reasons of religion, work, sleep, etc., may wish to only receive dispatch requests through his/her mobile device. As such, the responder can place the mobile device into a sleep mode (not shown in FIG. 4A) such that dispatch requests can be received, while telephone calls, push-to-talk functionality, text messaging, etc. are de-activated. In one embodiment, the responder, while remaining available, can also make his/her current location a fixed location such that the current location is not updated until the responder manually indicates that the fixed location should no longer be considered the current location of the responder. A transport icon presents the responder's current mode of transportation and may allow the responder to indicate a change in mode of transportation. A GPS icon can indicate whether GPS is functional and may allow the responder to change GPS settings. A log icon can allow the responder to view and enter reporting and other information regarding incidents. An equipment icon can allow the responder to update the type, location, quantity, and/or status of equipment owned or accessible by the responder.

Figure 4C:
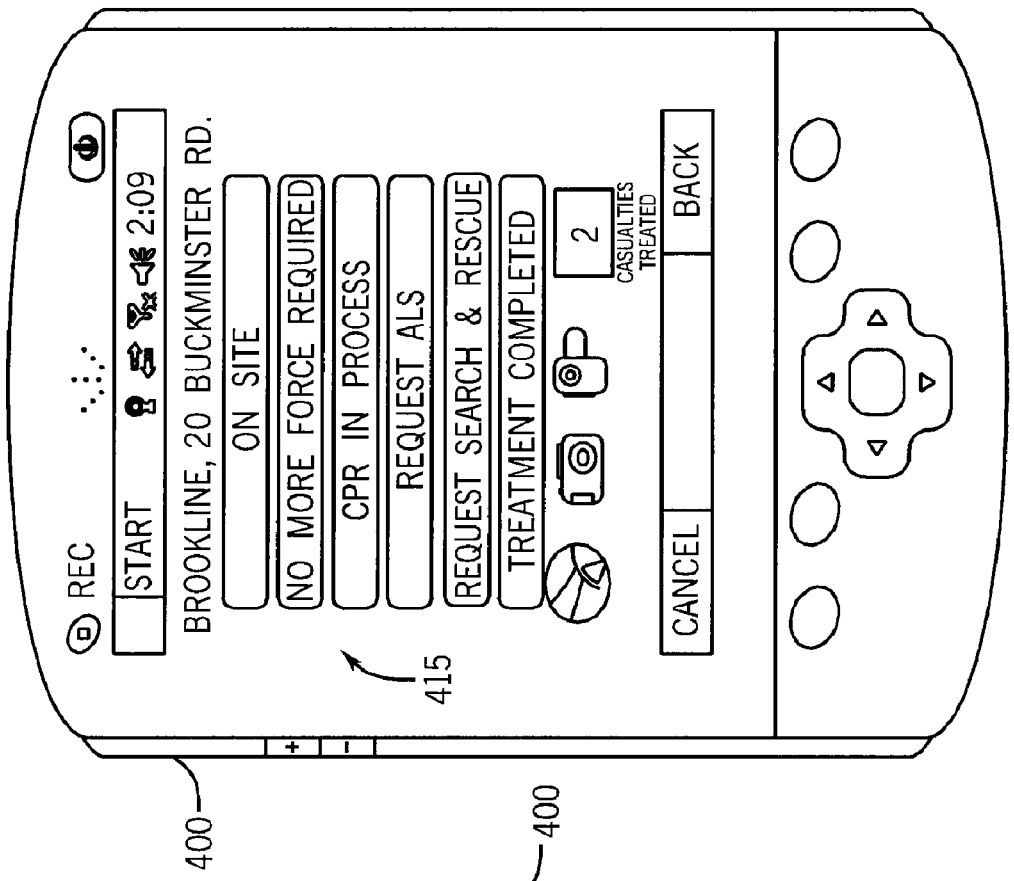
FIG. 4C illustrates the mobile device of FIG. 4A with a third responder interface screen in accordance with an exemplary embodiment.
Figure 4B:
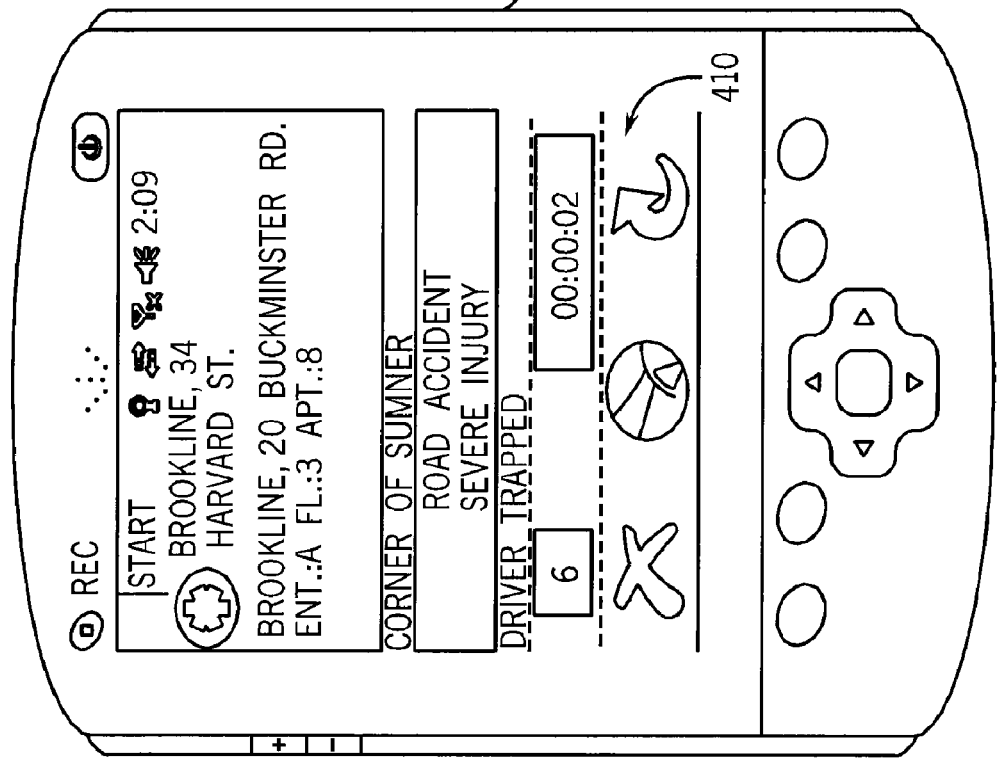
FIG. 4B illustrates the mobile device of FIG. 4A with a second responder interface screen in accordance with an exemplary embodiment.

FIG. 4B illustrates mobile device 400 with a second responder interface screen 410 in accordance with an exemplary embodiment. Second responder interface screen 410 illustrates a dispatch request received on mobile device 400 from the task management system. The dispatch request includes an incident location and incident information regarding the category and/or type of incident, and/or the type of injury. The dispatch request may also include any additional information to assist responders such as a notification of gun fire, a notification of a toxic chemical spill, etc. The dispatch request also includes a timer indicating elapsed time since the dispatch request was sent or received. The responder can use an appropriate button on second responder interface screen 410 (or a hard control on mobile device 400) to accept the dispatch request or refuse the dispatch request. Alternatively, the responder may ignore the dispatch request.

Upon acceptance of the dispatch request by the responder, the responder's position can be indicated on a map. The map can be provided to the dispatcher associated with the task management system and/or any agencies with which the responder is associated. In an exemplary embodiment, the responder's position may not be provided to the dispatcher/agency until the responder accepts the dispatch request such that the responder's privacy is maintained at all times when he/she is not actively responding to an incident. The responder can also be given a list of directions, map, voice commands, etc. providing the responder with directions to reach the incident location from his/her current position. In one embodiment, the responder may be able to view the map or other directions in advance of his/her decision to accept the dispatch request.

FIG. 4C illustrates mobile device 400 with a third responder interface screen 415 in accordance with an exemplary embodiment. Third responder interface screen 415 can be displayed to the responder upon acceptance of a dispatch request. Upon arrival at the incident location, the responder can indicate that he/she has arrived by activating an 'On Site' control. Upon activation of the 'On Site' control, the task management system can compare the responder's current location with the incident location. If the responder is more than a predetermined distance from the incident location, the task management system can notify the responder that he/she is at the wrong location. Upon receipt of a wrong location notification from the task management system, the responder may ignore the notification, signal that he/she is moving to the incident location, or inform the task management system that he/she is at the incident location and that the task management system is incorrect.

The responder can also use third responder interface screen 415 to access and fill out various reports. The responder can report on responder status by indicating that he/she has arrived at the incident location, indicating that treatment at the incident location is complete, etc. The responder can also provide a situational assessment to update the task management system with the latest incident information, including the activities being performed at the incident location (i.e., cardiopulmonary resuscitation (CPR) in progress, number of casualties, severity of casualties, hazmat dangers, etc.) The responder can also update incident requirements by indicating that no additional help/equipment is needed, indicating that additional help/equipment is needed, requesting a search and rescue operation, etc. The responder can also use third responder interface screen 415 to access camera and/or video hardware and software on mobile device 400 such that the responder can provide pictures and/or videos to the task management system. The responder may also view images and/or videos that are streamed to the responder.

Figure 4E:
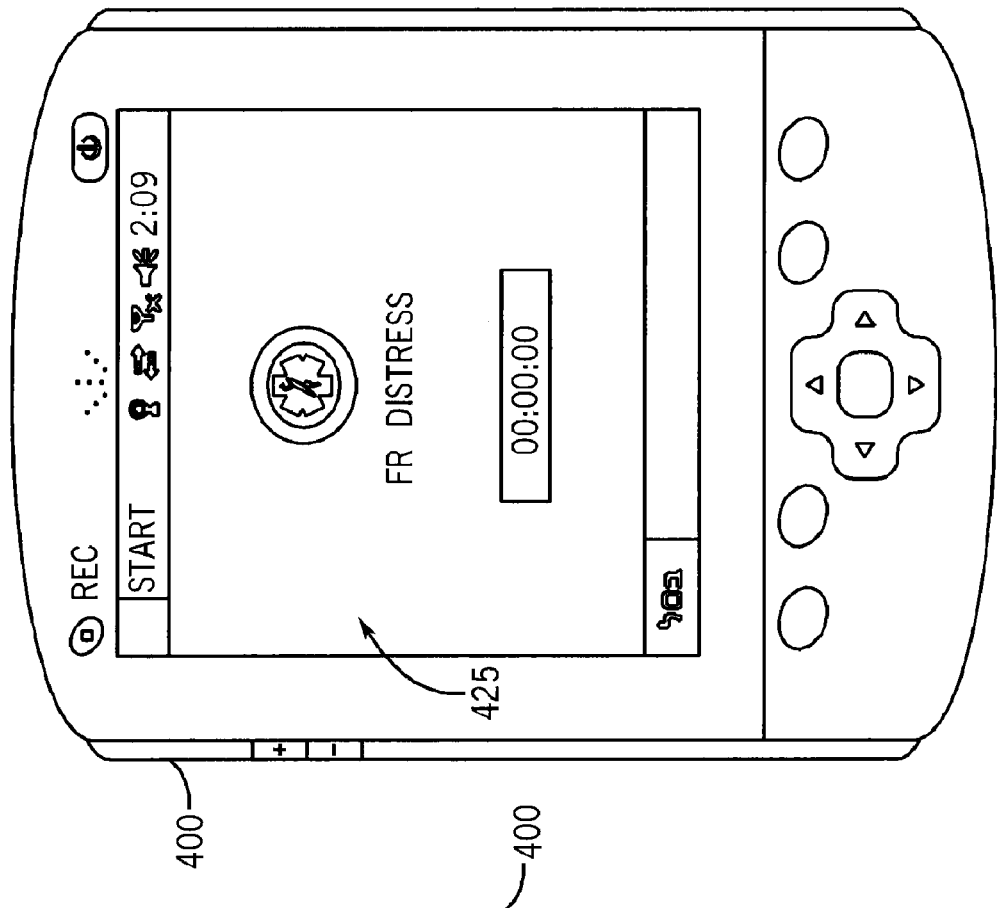
FIG. 4E illustrates the mobile device of FIG. 4A with a fifth responder interface screen in accordance with an exemplary embodiment.
Figure 4D:
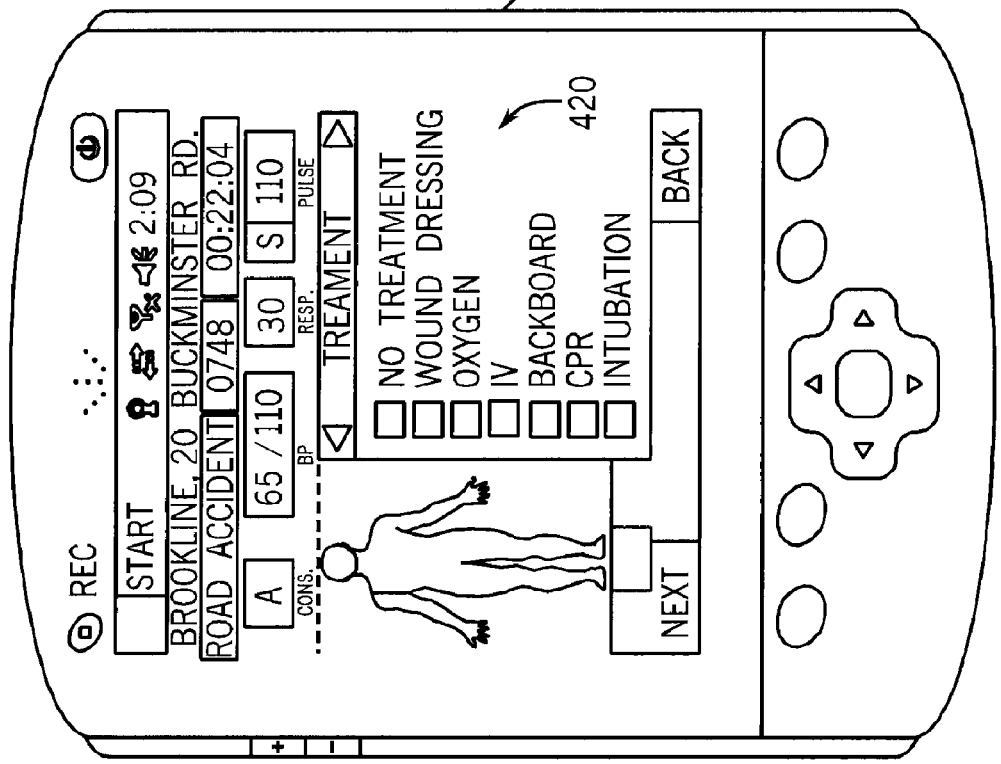
FIG. 4D illustrates the mobile device of FIG. 4A with a fourth responder interface screen in accordance with an exemplary embodiment.

FIG. 4D illustrates mobile device 400 with a fourth responder interface screen 420 in accordance with an exemplary embodiment. Fourth responder interface screen 420 illustrates an exemplary report which the task management system can request to be completed by the responder. The responder can complete the report during or after treatment of an individual at the incident location, depending on the severity and urgency of the incident. The report can request information regarding any treatments/procedures performed by the responder, the vital signs of the individual treated, the current status of the individual treated, where the individual treated was taken, etc. The report can also include information regarding the use, condition, location, and expenditure of equipment used during the response. In an exemplary embodiment, the task management system can use information received in the report to adjust incident scenarios in the incident scenario database. The task management system can also provide the report to an agency with which the responder is associated. The incident report can be customized in order to comply with the reporting requirements of the locality in which the responder is operating. In addition, the incident report may automatically be provided to a printer through Bluetooth, a wired connection, etc. such that the responder can print and sign the incident report. The signed report may be used for patient transfers involving hospitals, as a receipt for services rendered, etc.

FIG. 4E illustrates mobile device 400 with a fifth responder interface screen 425 in accordance with an exemplary embodiment. Fifth responder interface screen 425 illustrates how a distress signal can be used to initiate an incident process. Initiating the incident through a distress signal can be different from the above-described process for initiating an incident as a witness. The responder can use the distress signal when he/she is in need of assistance (while responding to an incident or while in his/her ordinary routine). The responder can activate the distress signal through the task management software and/or by pressing one or more hard buttons on mobile device 400. In an exemplary embodiment, activation of a distress signal by a responder can automatically inform any other responders in the vicinity of the responder that urgent help is requested at the location of the responder. As such, the distress signal can bypass the need for dispatcher approval such that the nearest responders are automatically dispatched in order to minimize any delay in the initial response. As the initial wave of responders are dispatched, the dispatch center can retake control of the dispatch process, and manage the incident the same as any other routine incident. Activation of the distress signal may also automatically initiate a voice call with a dispatcher such that the responder can rapidly provide incident information.

Figure 5:
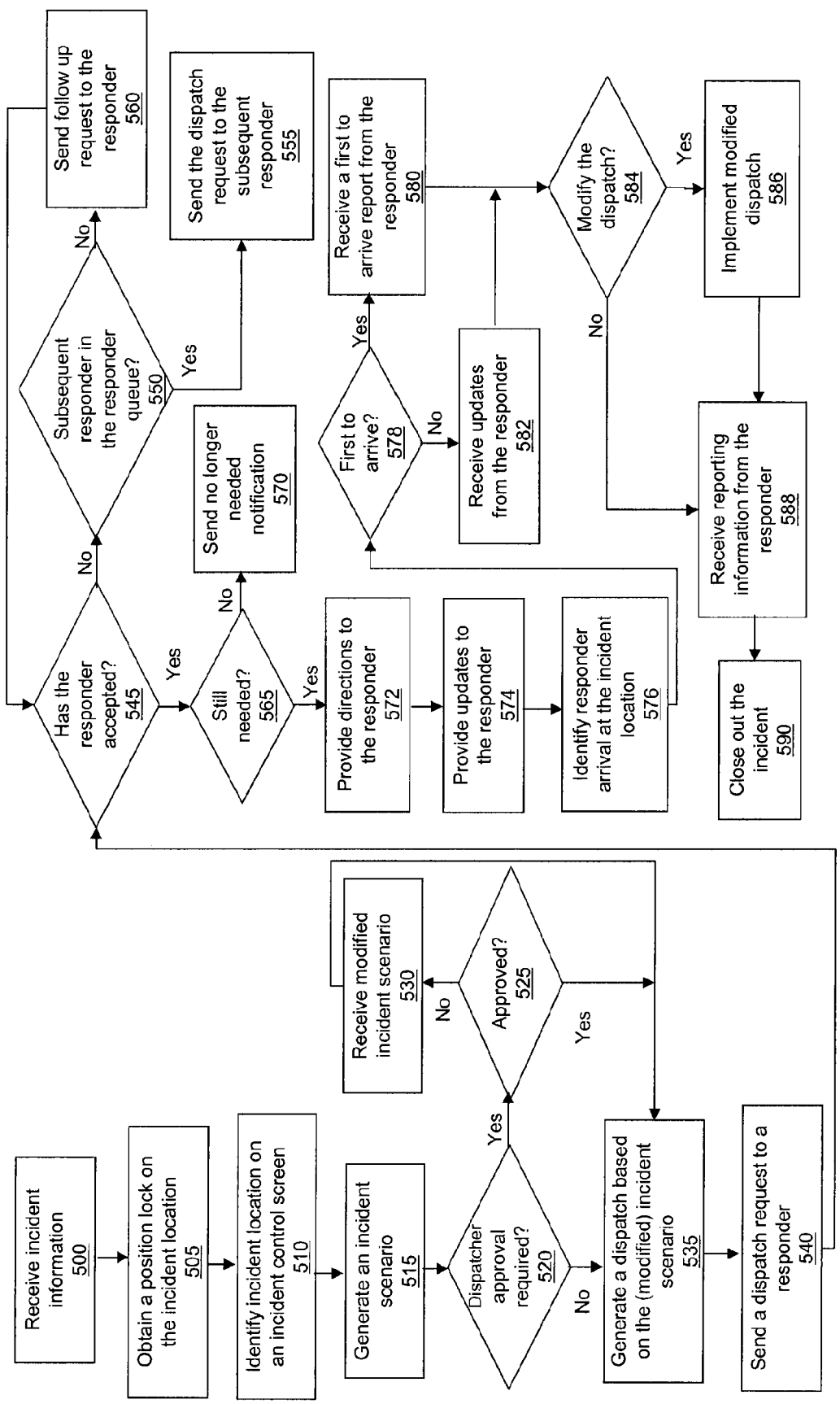
FIG. 5 is a flow diagram illustrating operations performed by a task management system in accordance with an exemplary embodiment.

FIG. 5 is a flow diagram illustrating operations performed by a task management system in accordance with an exemplary embodiment. In alternative embodiments, additional, fewer, and/or different operations may be performed. In an operation 500, incident information is received. As described with reference to FIG. 1, the incident information can be received through any method, including a telephone call, an e-mail, a text message, a satellite image, a voice message, a coded message, a distress signal from the mobile device of a responder, e-911, alarms and sensors, a witness message from the mobile device a responder, etc. The incident information may also be received from an agency or association, an on-scene bystander, an on-scene responder, etc. Using this network of sensors (both human and electronic), the task management system enables multiple dispatch scenarios, some of which involve no human interaction such that the process of dispatching responders is implemented with optimized speed and efficiency.

In one embodiment, the incident information may also be received from a transmitter in a safety or other device. For example, a vehicular airbag may include a sensor configured to cause a transmitter to provide incident information to the task management system upon deployment of the airbag. The transmitter may also include GPS or other location-based information such that the transmitter can provide location information to the task management system. As such, the task management system can be informed that there was an accident and/or the location of the accident. Similarly, a pacemaker or other medical equipment and devices may be equipped with a like sensor. Upon a malfunction or other problem with the pacemaker, local responders can automatically be notified of the incident. In one embodiment, activation of a sensor in an airbag sensor system or medical device sensor system can automatically be conveyed to all responders within the geographical vicinity, similar to the process described above with respect to a distress signal. As such, response efficiency can be maximized.

The incident information received by the task management system may vary from incident to incident. For example, a bystander may provide information regarding the location of a car accident, but no additional details. Conversely, a responder who witnesses an incident may provide detailed incident information including the address of the incident, the number of persons in need of treatment, the type(s) of treatment needed, the type(s) of equipment needed, the severity of the injuries sustained, the ages of the persons involved in the incident, etc. As such, the task management system can continually attempt to receive additional incident information which can be used to provide updates to responders and/or modify the dispatch.

Figure 6A:
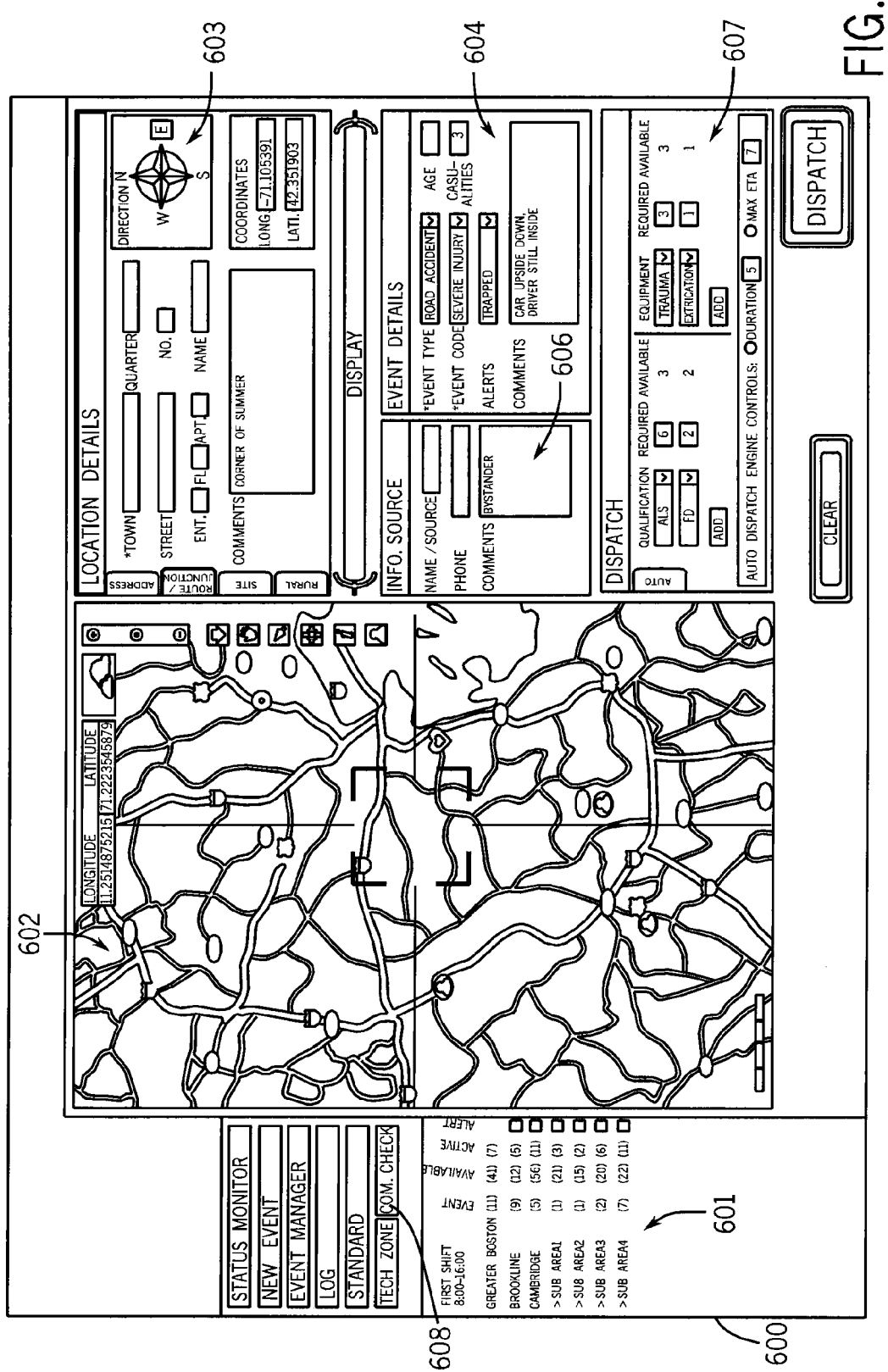
FIG. 6A is a screen shot of an incident information screen of a dispatcher interface in accordance with an exemplary embodiment.

In an operation 505, the incident information is entered into the task management system. The dispatcher can initiate a new incident by entering the incident information, or taking control of an incident initiated by a third party such as a responder or e-911. In an exemplary embodiment, the incident information can be manually entered into the task management system by a dispatcher through a dispatcher interface. The dispatcher interface can allow the dispatcher to interact with the task management system, view information regarding pending incidents, review and revise dispatches, send updates to responders, etc. FIGS. 6A-6C illustrate exemplary dispatcher interface screens for entry of incident location information and monitoring/control by the dispatcher and/or any agency officials.

FIG. 6A is a screen shot of an incident information screen 600 of a dispatcher interface in accordance with an exemplary embodiment. Incident information screen 600 includes an available resource manager 601, a map 602, a location details module 603, an incident (or event) details module 604, an information source module 606, a dispatch module 607, and an assets communication button 608. Resource manager 601 can be used to provide the dispatcher with a full summary view of ongoing activity and the ability to respond to additional incidents. Resource manager 601 includes a number of active incidents, a number of active responders, a number of available responders, and a breakdown of the qualifications of available responders, all broken down by region. The geographic region can be the region covered by a particular dispatcher or the region covered by an entire task management system. Resource manager 601 also includes information regarding a level of alert for the geographic region, shift information relevant to responders, agencies, and/or equipment, etc. The level of alert can be based on the weather, the number of active incidents, the number of available resources, information received from various agencies regarding potential threats, unusual events occurring in the area that may require support (i.e., parades, sporting events, festivals, etc.), etc. If the level of alert exceeds a predetermined threshold, the dispatcher or task management system can send out requests for additional responders to make themselves available.

Map 602 is made up of multiple layers that display incident locations and responders in the geographic region, and dispatch control options. Map 602 can also identify the locations of all responders in an area within a perimeter surrounding the incident location. In one embodiment, the borders of map 602 can coincide with the perimeter surrounding the incident location. Alternatively, map 602 may illustrate any other areas. The perimeter of the incident can be a predetermined area or may be specific to the incident based on incident information regarding the scope of the incident.

Information source module 606 allows the dispatcher to enter in a name and contact information of a source that provided the incident information. Alternatively, when an incident is initiated by a $3^{rd}$ party, the information source module may display information regarding the 3$^{rd}$ party to the dispatcher. For example, if the incident information is received through e-911, information source module 606 can indicate that the incident information was received through e-911, identify the e-911 source of the incident information, and/or display the e-911 transmission. In addition, all of the incident information and other information that is received by the task management system can be time-stamped and associated with a sender so that at any time during or after the incident, an incident log can be used to determine who took what actions, and when.

Location details module 603 can allow the task management system to obtain a position lock on an incident location such that responders can be provided with concise information and directions regarding how to locate the incident location. The position lock can be obtained based on any of a number of types of information entered into location details module 603. For example, as illustrated FIG. 6A, if the incident information includes an address, the dispatcher can enter the address into location details module 603, and provide any comments regarding the incident location. FIG. 6B is a screen shot of a route/junction entry screen 605 of location details module 603 in accordance with an exemplary embodiment. If the incident information includes route, highway, and/or junction information, the dispatcher can use route/junction entry screen 605 to enter the incident location and/or provide any comments. FIG. 6C is a screen shot of a site entry screen 610 of location details module 603 in accordance with an exemplary embodiment. If the incident information includes site information, the dispatcher can use site entry screen 610 to enter the incident location and/or provide any comments. A rural entry screen may also be available to the dispatcher to describe incident locations which are not associated with an address, route, or site. In alternative embodiments, the dispatcher can enter incident location information by any other method. Alternatively, the dispatcher can enter an incident location by clicking map 602 or entering coordinates. In one embodiment, if the incident is spread out over a large area, the dispatch can establish a perimeter for the incident by clicking on a plurality of locations on map 602. If the task management system is unable to lock onto a specific location based on the entered information, the task management system may lock onto an area and use the area as the incident location until additional incident information is received.

Incident details module 604 can be used by the dispatcher to categorize the incident, categorize any injuries, enter additional incident information, enter comments regarding the incident, etc. One or more entry screens may be provided for entering incident information regarding the type of incident and the number of persons involved in the incident. In one embodiment, the dispatcher can identify one or more codes based on the incident information. For example, a code of 001 may be used to identify a single car, car accident, a code of 002 may be used to identify a multiple car, car accident, a code of 092 may be used to identify a residential house fire, and so on. Similarly, sub-codes may be used to identify the types of injuries which need to be treated. For example, the code/sub-code 001-001 can correspond to a single car, car accident involving head trauma, the code/sub-code 001-002 can correspond to a single car, car accident involving lacerations, the code/sub-code 001-030 can correspond to a single car, car accident involving third degree burns, and so on. In an exemplary embodiment, the coded incident information can impact the type and quantity of responders which are asked to respond to the incident. Alternatively, any other coding system(s) may be used such that the dispatcher can rapidly, accurately, and efficiently convey received incident information to the task management system. Other entry screens can be used for the entry of any additional incident information. Alternatively, a single entry screen may be used for the entry of all incident information.

In an alternative embodiment, any or all of the incident information may be automatically reviewed, sorted, and utilized by the task management system. For example, the incident information may be received as a standardized report from a trusted agency. The task management system can automatically analyze the standardized report to identify the incident location, the type of incident, the number of individuals involved, and/or any other incident information. The standardized report may also include one or more codes as described above for conveying incident information to the task management system. The task management system can use the automatically identified incident information to generate an incident scenario, generate a dispatch, and send out a dispatch request to relevant responders.

FIG. 6A also includes an assets communication button 608 (or Com. Check button). The dispatcher can press assets communication button 608 in order to perform a status check of all assets (i.e. responders and equipment) that are associated with the task management system. The dispatcher can also use assets communication button 608 to implement an advanced search of all assets, to take a quick survey of responders, to perform a positioning survey of responders, and/or to conduct surveys for projected incidents. The advanced search of all assets can allow the dispatcher to search assets based on any known criteria. For example, the dispatcher may search for all responders having a four wheel driving mode of transportation and possessing a defibrillator that is going to expire within the next two months. The quick survey of responders can allow the dispatcher (or agency official) to quickly canvass one or more responders regarding a specific issue. For example, the dispatcher can ask any or all responders whether they plan on being in or out of town on the following weekend. The quick survey can be sent to all responders or a subset of responders identified through the advanced search. A positioning survey can allow the dispatcher to send a message to any or all responders requesting that they show the dispatcher their current position A survey for a projected event allows the task management system or dispatcher to ask responders whether they would be willing to sign-up for a future incident. If a responder agrees to participate, he/she can be included in the planning for the incident, which may be a training program, a future sporting event, etc.

Referring back to FIG. 5, the task management system obtains a position lock on the incident location in an operation 510. The position lock can be obtained by any of the methods described above with reference to FIGS. 6A-6C. In an operation 515, an incident scenario is generated. As described with reference to FIG. 1, the incident scenario can be a detailed response plan for responding to the incident, including a number of desired responders, desired skills of the responders, desired equipment, desired experience of the responders, a desired amount of time until arrival of the first responder, a desired amount of time until responding to the incident is completed, etc. In an exemplary embodiment, the incident scenario can be obtained from an incident scenario database based on the received incident information. In an alternative embodiment, an on-the-fly algorithm can be used to automatically generate the incident scenario based on the incident information, additional information received from remote databases, reports regarding the handling of prior incidents, and/or any other relevant information.

In an operation 520, a decision is made regarding whether dispatcher approval of the incident scenario is required.

Whether dispatcher approval is required to implement an incident scenario can be based on the type of incident, the severity of the incident, the number of individuals involved in the incident, the experience level of the dispatcher, or any other factors. If dispatcher approval is required, a determination is made regarding whether the dispatcher has approved the incident scenario in an operation 525. If the incident scenario is not approved, a modified incident scenario is received in an operation 530. In an exemplary embodiment, the incident scenario can be modified by the dispatcher prior to an initial dispatch using dispatch module 607 illustrated with reference to FIG. 6A. Dispatch module 607 is described in more detail below. The incident scenario may also be modified after the initial dispatch using a queue manager. The queue manager is described in more detail with reference to FIG. 7. In another exemplary embodiment, the incident scenario can be modified based on incident information which the dispatcher was unable to appropriately convey to the task management system and/or based on newly received incident information. For example, the dispatcher may receive an image or video of the incident which indicates that the incident is more or less severe than the description of the incident indicates. As such, the dispatcher can modify the scenario accordingly.

If dispatcher approval is not required or if the dispatcher approves the incident scenario, a dispatch based on the incident scenario is generated in an operation 535. If the dispatcher did not approve the incident scenario, the dispatch may be based on the modified incident scenario received in operation 530. As described with reference to FIG. 1, a dispatch engine can identify responders and/or equipment by using one or more assets databases to determine the incident effectiveness of the responders/equipment to the specific incident. The identified responders may be from a plurality of different agencies (i.e., police department, volunteer organization, hazmat team, individual volunteers, etc.)

Based on the resources called for in the incident scenario and the determined incident effectiveness of available responders and equipment, the dispatch engine can generate one or more responder queues and/or one or more equipment queues corresponding to each of the assets identified in the incident scenario. The queues can be ranked lists of relevant assets (i.e., responders and equipment). If at any time there are an insufficient number/type of responders or equipment responding to the incident, the dispatch engine can work down the queue(s) until an adequate amount of resources are dispatched. In an exemplary embodiment, dispatch module 607 illustrated in FIG. 6A allows the dispatcher (or agency official) to view the proposed response to the incident based on the incident scenario. Dispatch module 607 also allows the dispatcher (or agency official) to manually override the recommended asset allocation to achieve an optimal response to the incident.

As an example, the incident scenario may indicate that four responders with medical training in handling severe trauma are needed. The dispatch engine may identify nine responders who satisfy the criteria of the incident scenario. As described with reference to FIG. 1, the dispatch engine can determine an incident effectiveness for each of the nine responders, rank the nine responders based on their incident effectiveness, and place them in a responder queue in ranked order. A second responder queue for including responders who can treat severe burns may also be generated. The dispatch engine can similarly generate the one or more equipment queues. Alternatively, if responders are in possession of equipment to be used in responding to the incident, the responder queue(s) and the equipment queue(s) may be combined into a single queue which is used to ensure that a maximized amount of the resources identified in the incident scenario are dispatched to the incident. The dispatch can also include one or more tasks which are assigned to the responders in the responder queue(s).

In one embodiment, the dispatch may be directed toward assets of a second agency which are not under the direct control of a first agency, etc. that plans to issue the dispatch request. In such an event, the first agency may need to obtain approval from the second agency in order to request the assets from the second agency. The approval can be obtained manually or automatically based on predetermined permissions. For example, the dispatch may be from a fire department and may include one or more police officers. Prior to implementing the dispatch, the task management system may request approval from the police department to include the police department assets in the response. The approval may be requested through a pop-up window (on a computer screen of a police department dispatcher), or by any other method.

In an operation 540, a dispatch request is sent to a responder. In an exemplary embodiment, the responder can refer to any responder to which the dispatch request has been sent. The dispatch request can actually be simultaneously sent to the first x responders in the responder queue, where x corresponds to the number of responders identified in the incident scenario. However, for purposes of simplification, the process will be described with reference to a single responder. It is to be understood however, that in practice, the task management system may simultaneously interact with a plurality of responders to optimize response time for the incident. In one embodiment, the dispatch may be reviewed and approved by the dispatcher prior to sending the dispatch request, similar to the process described in operations 525 and 530 with reference to the incident scenario. Alternatively, the dispatch request may be automatically sent. In addition to a request for assistance, the dispatch request may include the incident location, a description of the incident, tasks assigned to the responder, and/or any other relevant information.

In an operation 545, a determination is made regarding whether the responder has accepted the dispatch request. By accepting the dispatch request, the responder is agreeing to go to the incident location and perform one or more tasks identified in the dispatch request. Alternatively, specific tasks may not be identified in the dispatch request, and the responder may be asked to provide any possible assistance at the incident location. If the responder accepts the dispatch but then comes to the conclusion that he/she will not be able to make it to the incident within a reasonable amount of time (i.e. he runs out of gas) the responder is able to press a button on FIG. 4C 'Cancel' and he will be removed from the dispatch and replaced by the next most relevant responder in his queue. The responder can be considered to have not accepted the dispatch request if the responder has ignored the dispatch request (i.e., not sent a response) and/or if the responder has refused the dispatch request. The responder can be considered to have ignored the dispatch request if the responder does not provide a response within a predetermined time period such as 30 seconds, 60 seconds, etc. If the responder has not accepted the dispatch request, a determination can be made regarding whether there is a subsequent responder in the responder queue to whom the dispatch request can be sent in an operation 550. If there is a subsequent responder in the responder queue, the task management system sends the dispatch request to the subsequent responder in an operation 555, and a similar process can be implemented with respect to the subsequent responder. As such, the task management system can keep going down the responder queue until an adequate number of responders have accepted the dispatch request.

If there is not a subsequent responder in the responder queue, the task management system sends a follow up request to the responder in an operation 560. The follow up request can be an urgent message indicating that there is still a need for additional responders, and requesting that the responder accept the dispatch request. In one embodiment, the follow up request may only be sent in predefined urgent situations (i.e., when no responders have accepted, when only a predefined percentage of the desired number of responders have accepted, etc.). In one embodiment, responders may be able to set a responder preference such that follow up requests are not received. After sending the follow up request, the task management system can continue to monitor whether the responder has accepted in operation 545.

If it is determined in operation 545 that the responder has accepted the dispatch request (based on an acceptance from the responder or information from a different source), a determination is made in an operation 565 whether the responder is still needed. If it is determined that the responder is no longer needed, a no longer needed notification is sent to the responder in an operation 570. The responder may no longer be needed if an adequate number of responders have already accepted, if additional incident information indicates that responders at the incident location have the incident under control, if the responder is delayed due to traffic or vehicular break down, etc. If it is determined in operation 565 that the responder is still needed, the responder is provided with directions in an operation 572. The directions can include any combination of an identification of the incident location by address, route, site, etc., turn-by-turn text directions, and/or audio directions. The directions can also include a map which can illustrate the incident location, the current position of the responder, and/or the positions of other responders. The directions may be updated as the task management system receives updates regarding the weather, traffic conditions, etc. The directions may be based on the current mode of transportation of the responder.

In an exemplary embodiment, the task management system can also determine an expected arrival time of the responder at the incident location. The expected arrival time can be based on the responder's current mode of transportation, the weather, traffic, and/or the ability of the responder disobey traffic laws. The task management system can also estimate times that the responder will pass various locations along his/her route to the incident location. The task management system can track the progress of the responder, and if the responder does not reach these various locations within a predetermined time of the estimated time, this can indicate a delay. In the event of a delay, the task management system or dispatcher may contact the responder to find out if there is a problem. Alternatively, or in addition, the task management system may send the dispatch request to another responder in the responder queue to ensure the timely arrival of an adequate number of responders.

In an operation 574, updates are provided to the responder. The updates can include updates to the directions as described above, updates to the incident information, updates to the dispatch request, updates regarding desired equipment, etc. The task management system can receive the updates from other responders, agencies, news crews, or any other sources in communication with the task management system. In an operation 576, an arrival of the responder at the incident location is identified. The arrival can be identified based on GPS tracking of the responder and/or based on a message received from the responder. If the arrival is based on a message from the responder, the task management system can use GPS signals to verify the responder's arrival. If the responder's location does not match the incident location known to the task management system, the responder location may be used to correct the incident location. Alternatively, depending on the responder's level of authority, the responder may be able to override the task management system and manually update the incident location. Alternatively, it may be determined through queries that a second incident location has been identified, and a second dispatch may be generated.

In an operation 578, a determination is made regarding whether the responder is the first to arrive at the incident location. If it is determined that the responder is the first to arrive at the incident location, a first to arrive report can be received from the responder in an operation 580. The first to arrive report can include any relevant information not known by the task management system. Depending on the quality of the incident information received in operation 500, the task management system may have little information regarding the details of the incident until the first responder arrives at the incident location. In one embodiment, the first to arrive report can be a list of questions generated by the dispatcher and/or the task management system. Alternatively, the first to arrive report may be a protocol which is specific to the type of incident. In alternative embodiments, a first to arrive report may not be used and/or completion of the first to arrive report may be up to the discretion of the responder based on the severity and urgency of the incident. If it is determined in operation 578 that the responder is not the first to arrive, updates may still be received from the responder in operation 582. For example, in an incident spread out over a large area such as a plane crash, the responder may arrive at a location within the incident perimeter where other responders have not yet been. As a result, the responder may identify additional individuals which are in need of assistance. The responder can provide this information as an update to the task management system.

In an operation 584, a determination is made regarding whether the dispatch should be modified based on information from the first to arrive report and/or information in received updates. The determination can be made by the dispatcher and/or automatically by the task management system, depending on the embodiment. If it is determined that the dispatch is to be modified, a modified dispatch is implemented in an operation 586. The modified dispatch may include a request for additional resources (i.e., responders and/or equipment) based on the received information, an expansion of the geographic area from which responders and/or equipment are requested, and/or an adjustment to the perimeter defined for the incident. Alternatively, the modified dispatch may indicate that fewer resources are needed such that no longer needed notifications are sent to responders who may still be en route. In an exemplary embodiment, the dispatcher can also search for specific types, qualifications, etc. of responders and/or equipment, and dispatch additional responders/equipment based on the search results.

Regardless of whether the dispatch is modified subsequent to the responder's arrival at the incident location, reporting information is received from the responder in an operation 588. The reporting information can include a description of actions performed, results of the incident, information regarding treated individuals, information regarding equipment status after the incident, comments regarding the incident, comments regarding other responders, and/or any other information relevant to the incident and what occurred during the response to the incident. An exemplary reporting screen is described above with reference to FIG. 4D. In an operation 590, the incident is closed out. The dispatcher or task management system can continue to monitor the position of the responders and the incident may not be closed out until every responder that was involved in responding to the incident has signaled to the task management system that they have completed their task(s) (including the filing of all post-incident reports) and have signaled to the system—through pressing a button 'return to routine' on FIG. 4D (not shown).

Closing out the incident can include providing any reporting information to appropriate agencies associated with the responder or otherwise interested in the incident. The reporting information may be information regarding an individual treated during the incident, information regarding responders, information regarding expended equipment such as gloves, oxygen masks, tools, etc., information regarding a number of kilometers traveled, or any other information relating to the response to the incident. Closing out the incident can also include incorporating all relevant information regarding the response to the incident into the task management system such that future incident scenarios and dispatches involving similar incidents can be improved upon. Closing out an incident can also include the creation of an aggregate incident log that combines all responder activities (across all agencies) for the particular incident. The incident log (or portions thereof) can be sent to any agencies involved if particular irregularities or exceptional items are recognized by the task management system in the incident log. (i.e. if the responder was poked by a needle while administering care). Closing out an incident can also include the creation of a printer-ready transfer report for the transfer of patients to a hospital, or any other reports which may require a signature. Closing out the incident can also include updating the responder profile of the responder based on his/her performance during the response to the incident. The updated responder profile can be used in part to determine where the responder is ranked in subsequent responder queues. A responder can indicate that he/she is done responding to an incident by activating a 'return to routine' control which can be presented on a mobile device of the responder upon completion of the reports associated with FIG. 4D.

Although not illustrated in FIG. 5, the dispatch request can also be sent to individuals/entities who own or have access to equipment from the equipment queue. A process similar to that described in operations 540 through 572 with respect to the responder queue can be used to go through the equipment queue to ensure that adequate equipment is dispatched to the incident. For example, an ambulance may be listed in the equipment queue and the dispatch sent to an ambulance service located closest to the incident location. If the task management system does not receive a response from the ambulance service or if dispatch request is refused (i.e., because all of the ambulances are currently in use), the dispatch engine can send the dispatch request to the next ambulance service on the equipment queue, and so on.

Figure 7:
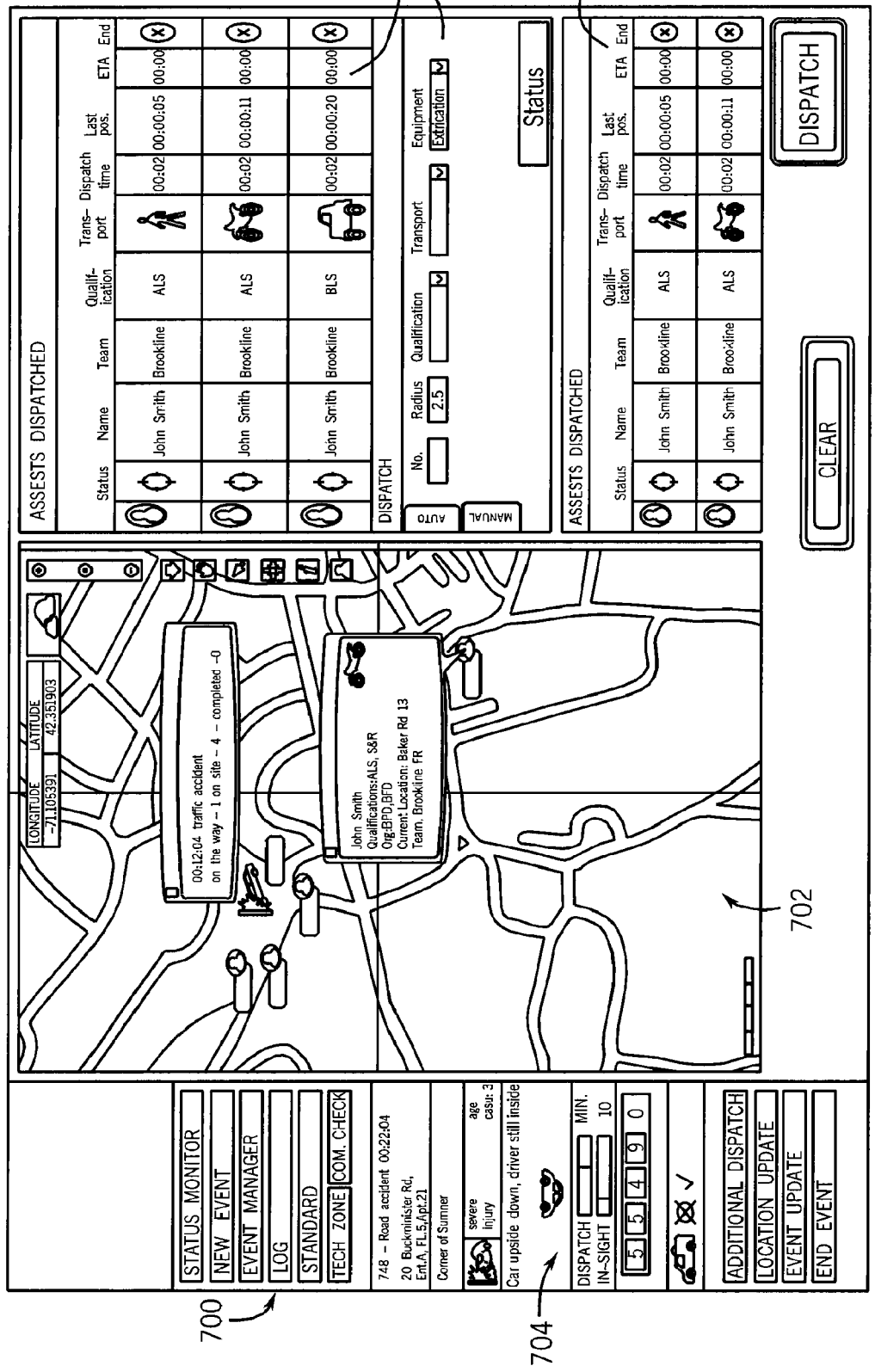
FIG. 7 is a screen shot of an event manager screen of a dispatcher interface in accordance with an exemplary embodiment.

In an exemplary embodiment, the dispatcher (or agency official) can use an event manager to manage a response to an incident after the dispatch request has been sent. FIG. 7 is a screen shot of an event manager screen 700 in accordance with an exemplary embodiment. Event manager screen 700 includes a dynamic map 702, an event tracker 704, and a queue manager 706. In an exemplary embodiment, dynamic map 702 can be part of a geographic information system that is used to gather, analyze, and present geographic information which is relevant to a particular incident. As illustrated in FIG. 7, dynamic map identifies an incident location of a traffic accident and the locations of responders within the area/perimeter of the incident. As described in more detail below, the dispatcher can use this information to identify traffic slow downs, to provide support to responders en route, and/or to adjust the dispatch based on responder progress. In one embodiment, dynamic map 702 may also be provided to responders through the task management application and/or agencies involved in the response.

Event tracker 704 of event manager screen 700 can be used by the dispatcher as a visual aid for monitoring the progress of the responders and equipment in responding to a specific incident. Event tracker 704 monitors the number of responders who have agreed to respond and the number of responders already at the incident location. For example, 20 responders can be dispatched to an incident. If 15 responders accepted the dispatch request, the dispatch bar (which shows 65% in FIG. 7) of event tracker 704 may read 75%, indicating that 75% of the requested responders have accepted. If only 10 of the 20 responders who were requested have arrived at the incident location, the on-site bar (which shows 11% in FIG. 7) of event tracker 704 may read 50%. In addition, event tracker 704 visually presents the dispatcher and/or any other agency officials with reports from the field, including responder status, situation assessments, and incident requirements. In one embodiment, the task management system can notify the dispatcher if a received report indicates that action by the dispatcher may be needed. For example, a report indicating that no more responders are needed at an incident location can be presented to the dispatcher through a pop-up window or by any other method such that the dispatcher knows to cancel the dispatch request to any additional responders.

Queue manager 706 can also allow the dispatcher to track the progress of the response. Queue manager 706 includes a dispatched assets list which identifies the dispatched responders, the mode of transportation of the dispatched responders, an agency or team with which the dispatched responders are associated, qualifications of the dispatched responders, an estimated time of arrival of the dispatched responders, etc. Based on the progress shown on dynamic map 702 and queue manager 706 and/or based on the updates/reports received from responders or other sources, the dispatcher may decide to manually modify the dispatch by adding or removing responders. In one embodiment, the dispatched assets list, dynamic map 702, and/or any other information can be provided to agencies involved in the response such that the agencies can track and monitor their own responders. In an exemplary embodiment, all agencies associated with the task management system can agree to follow the dispatch generated by the task management system.

FIG. 8A illustrates a dispatch assets search and modification screen 800 of the dispatcher interface in accordance with an exemplary embodiment. The dispatcher can use dispatch assets search and modification screen 800 to monitor response progress, add responders and/or equipment to the dispatch, to remove responders and/or equipment from the dispatch, to search for responders with a given skill or qualification, etc. Upon a modification of the dispatch, the task management system can automatically implement the appropriate action(s). For example, if the dispatcher removes a responder who is en route from a dispatched assets list, the task management system can automatically send that responder a no longer needed notification. In alternative embodiments, event manager screen 700 illustrated in FIG. 7 and/or dispatch assets search and modification screen 800 illustrated in FIG. 8A may include additional, fewer, and/or different functionality and components.

Figure 8B:
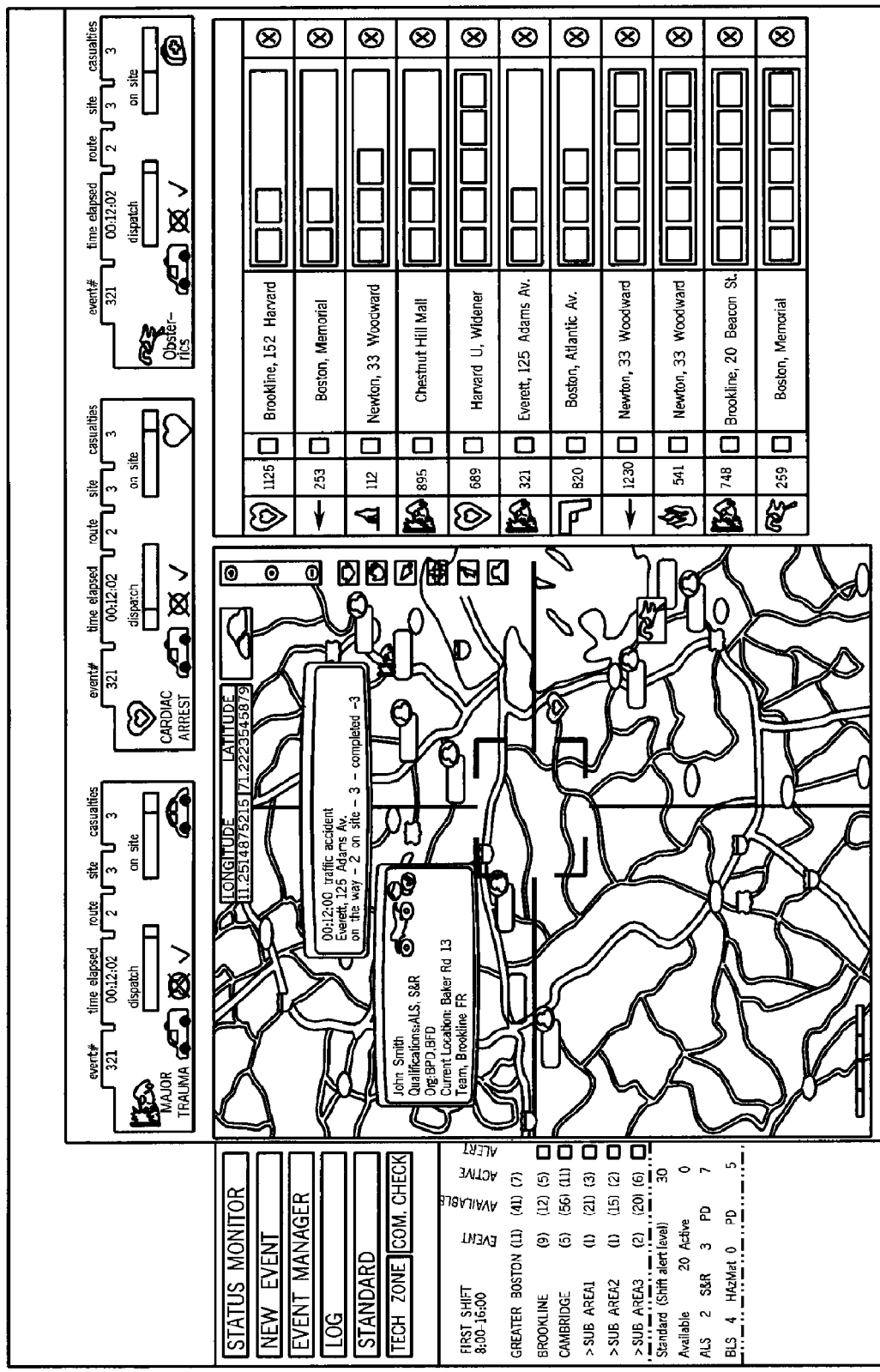
FIG. 8B is a screen shot of a situation overview screen of the dispatcher interface in accordance with an exemplary embodiment.

FIG. 8B is a screen shot of a situation overview screen 805 of the dispatcher interface in accordance with an exemplary embodiment. Situation overview screen 805 provides a dispatcher with status information corresponding to a plurality of active incidents. The dispatcher can use situation overview screen 805 to simultaneously monitor the plurality of active incidents, to drill down and obtain additional information regarding any of the plurality of active incidents, and/or to close out incidents. The dispatcher can also use situation overview screen 805 to obtain various map views corresponding to any of the plurality of active incidents, to locate responders associated with any of the plurality active incidents, etc.

Figure 9:
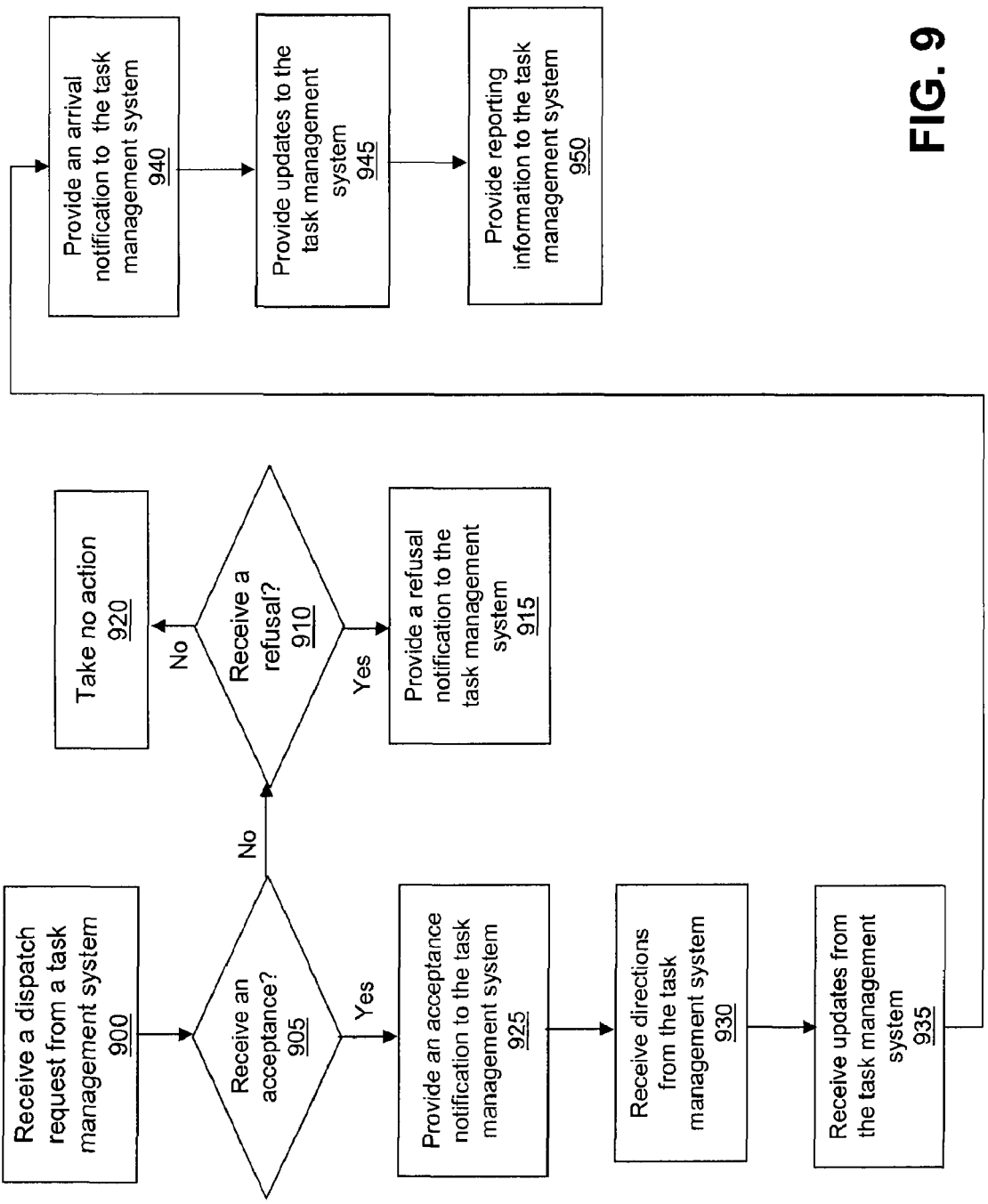
FIG. 9 is a flow diagram illustrating operations performed by a mobile device in communication with a task management system in accordance with an exemplary embodiment.

FIG. 9 is a flow diagram illustrating operations performed by a mobile device in communication with a task management system in accordance with an exemplary embodiment. In alternative embodiments, fewer, additional, and/or different operations may be performed. In an operation 900, a dispatch request is received from a task management system. In an operation 905, a determination is made regarding whether an acceptance of the dispatch request is received as an input from a responder associated with the mobile device. If an acceptance of the dispatch request is not received, a determination is made in an operation 910 regarding whether a refusal of the dispatch request is received from the responder. If a refusal is received from the responder, a refusal notification is provided to the task management system in an operation 915. If a refusal is not received from the responder, no action is taken in an operation 920, and the task management system may consider the dispatch request to have been ignored.

If it is determined in operation 905 that an acceptance is received from the responder, an acceptance notification is provided to the task management system in an operation 925. In an operation 930, directions to the incident location are received from the task management system. Alternatively, the directions may be received from any other source. In an operation 935, updates are received from the task management system. The updates can include any incident information not included in the dispatch request, updated directions, and/or any other information relevant to responding to the incident. In an operation 940, an arrival notification is provided to the task management system. The arrival notification may be provided based on an input from the responder or automatically by the mobile device, depending on the embodiment. Alternatively, the task management system may track the mobile device such that the arrival notification is not needed.

In an operation 945, updates are provided to the task management system. The updates can be received as inputs from the responder, and may include incident information, traffic updates, weather updates, a first to arrive report, and/or any other information relevant to the incident. In an operation 950, reporting information is provided to the task management system. The reporting information can be received as an input from the responder during or upon completion of a response to the incident. In an exemplary embodiment, the operations described with reference to FIG. 9 can be performed by the above-described task management application.

Figure 10:
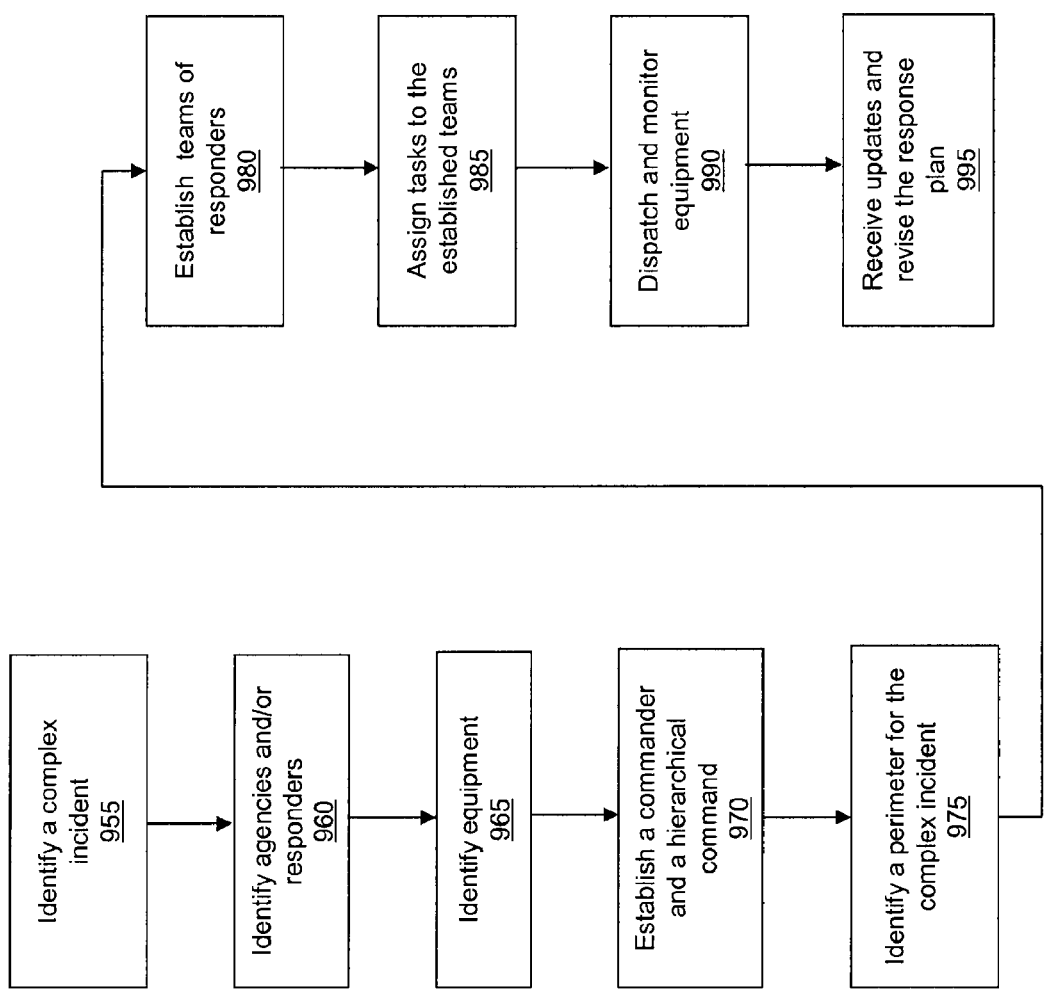
FIG. 10 is a flow diagram illustrating operations performed by a task management system in the event of a complex incident in accordance with an exemplary embodiment.

FIG. 10 is a flow diagram illustrating operations performed by a task management system in the event of a complex incident in accordance with an exemplary embodiment. In alternative embodiments, fewer, additional, and/or different operations may be performed. A complex incident can refer to a search and rescue operation, emergency coverage for a large gathering of people (i.e., concert, sporting event, demonstration, etc.), a mass casualty event such as a terrorist attack, or any other incident which may be spread out over a large area or which involves a large number of people. In an operation 955, a complex incident is identified. The complex incident can be identified based on received incident information. In one embodiment, a predetermined threshold value for a number of people involved in the incident or a number of agencies which need to be involved in the response may be used to determine if the incident is a complex incident. Alternatively, the type of incident (i.e, bombing) may determine whether the incident is considered to be a complex incident. In one embodiment, a dispatcher may decide whether an incident is a complex incident based on the received incident information.

The received incident information regarding a complex incident may initially be sporadic, vague, and/or inaccurate. As such, the task management system may rely on responders to be witnesses and provide additional incident information. The task management system can do this by requesting information from responders prior to assigning tasks. The task management system may also ask all responders in the vicinity to make their status 'available' such that they can be assigned tasks and/or to activate location tracking on their mobile devices such that the responders can be tracked. In an exemplary embodiment, responders can be contacted using assets communication button 608 described with reference to FIG. 6A. As additional incident information is received, the task management system can update relevant responders and agencies regarding any threats/dangers involved and commence with a dispatch and task assignments. Alternatively, the complex incident may be a potential complex incident which is known of in advance (i.e., a planned concert, sporting event, or demonstration). The task management system can ask responders to register in advance to be activated for the potential complex incident. Registering for the potential complex incident may place the responders on standby in the event that there are any problems. Alternatively, registering for the potential complex incident may involve active monitoring, assistance, etc. by the responders.

In an operation 960, agencies and/or individual responders are identified. As incident information is received, a dispatcher and/or the task management system can determine relevant agencies whose services may be used to respond to the complex incident. The individual responders may be identified based on their locations and/or relevant skills. For example, a responder who is in the direct vicinity of the complex incident may be asked to respond to the complex incident for the purpose of providing incident information to the task management system regardless of the responder's skills. The task management system may generate multiple responder queues, with each responder queue corresponding to responders having a particular skill. In an operation 965, equipment is identified which may be used to assist in the response to the complex incident. Depending on the severity and location of the complex incident, equipment may be imported from outlying regions.

In an operation 970, a commander and a hierarchical command are established. The commander can be an individual or agency who is placed in charge of the response to the complex incident. The commander may be established based on the type of incident(s) involved in the complex incident, based on the agencies involved in responding to the complex incident, based on the location of the complex incident, etc. The commander may also be selected based on a predetermined command structure. The hierarchical command can be a detailed command plan which identifies a line of command for the individuals and agencies involved in the response. The line of command can identify who has the authority to assign tasks, who reports to who, how different agencies interact with one another, etc. The line of command may also include multidimensional management of authorizations and/or qualifications of responders and/or agencies.

In an operation 975, a perimeter for the complex incident is identified. The perimeter can be an area surrounding the complex incident in which responders may be assigned tasks. The perimeter may be identified based on incident information received from responders and agencies. In one embodiment, the perimeter may be identified by the commander. Alternatively, the task management system and/or any other responders may assist in identification of the perimeter. In an exemplary embodiment, the perimeter can be used as the basis for mapping and other informational operations used to monitor the complex incident and disseminate information regarding the area. In addition, the incident perimeter may be dynamic based on incident particulars (i.e., wind direction may be a factor if the incident is a hazmat situation). For example, aerial views and/or maps of the area within the perimeter can be obtained, a topography analysis of the area can be performed to determine a line of sight, graphical views of the locations of the commander, teams, responders, equipment, etc. within the area can be generated, a graphical display tracking the progress of responders can be used to determine locations in the area where assistance has not yet been provided, maps of the area can be used to generate courses for teams of responders to follow, landing points for helicopters/airplanes within the area can be identified, maps of the area can be marked with discoveries for later recovery (i.e., location of an airplane black box), maps of cellular/satellite coverage and dead spots can be generated, key locations such as hospitals, airports, gas stations, etc. within the area can be highlighted on maps of the area, moon status in the area can be identified, weather in the area can be identified, and so on. In one embodiment, icons used on all graphical maps, etc. can be agreed upon icons which are known and understood by all involved agencies such that confusion is minimized.

In an operation 980, teams of responders are established. The teams of responders may be established based on the skills of individual responders, based on agency affiliation, based on a present location, and/or based on any other factors. As such, a team of responders may include responders from a plurality of different agencies. Teams may also be assigned team leaders by the commander and/or the task management system. In one embodiment, the teams may be established by the commander. Alternatively, teams may be established in advance or the task management system may establish the teams on-the-fly based on the incident information. In alternative embodiments, teams may not be established, and individual responders may be assigned tasks.

In an operation 985, tasks are assigned to the established teams and/or to individual responders. In an exemplary embodiment, the commander can generate a response plan using drag and drop operations on a map of the area within the perimeter. For example, the commander can place icons on the map corresponding to tasks which are to be performed at those locations. The commander can also place icons corresponding to each team/responder at the locations on the map such that the teams/responders are assigned the tasks. In one embodiment, the commander may use a task toolbox having icons corresponding to a plurality of tasks and/or a team/responder toolbox having icons corresponding to teams/responders. Alternatively, any other methods may be used to indicate the tasks and/or to direct the teams/responders. When all of the icons are placed and the tasks indicated for a plurality of tasks and/or teams, the commander can activate the response plan.

For example, in the event of a complex incident involving a plane crash, the commander can drag an icon for a 'mobile command center' to a point on the map. As such, multiple queues are created in order to dispatch all relevant responders and assets that are involved with setting up the mobile command center can be dispatched to the point identified on the map with their task being to set up the mobile command center at the identified location. Similarly, the commander can drag and drop a 'field hospital' icon at a selection location on the map. In response, multiple queues are created in order to dispatch all resources identified by the dispatch engine (or in the scenario database) for creating the field hospital can automatically be dispatched to the second location with the task of setting up the field hospital. To summarize, the response to a complex incident can be comprised of multiple tasks, and each task can be made up of many different roles and responsibilities. Therefore, the activation of a complex incident response plan can activate multiple asset queues, with each managed as if they were in a standard incident.

Upon activation of the response plan, the task management system can automatically send dispatches to the teams/responders informing them of their instructions. The task management system can include additional information in the dispatches such as the quickest route for the teams/responders to take, the number of responders heading to each location, any known threats at each location, and so on. In one embodiment, prior to activating the response plan, the commander can simulate the response plan to determine if any changes should be made. The simulation can identify estimated times of arrival for each team to each location, potential problems with the proposed response plan, the routes that will be taken by the teams, and so on. The commander can either revise the response plan or activate the response plan based on the simulation. As such, the commander can simultaneously assign multiple tasks to multiple responders/teams to ensure that the response to the complex incident is implemented efficiently and rapidly. In an exemplary embodiment, the commander can also use the area map to generate one or more contingency plans for specific teams, locations, or tasks in the event that problems are encountered by any of the teams/responders.

In an operation 990, equipment is dispatched and monitored. In one embodiment, the equipment can be dispatched using drag and drop operations as described with reference to operation 985. The commander can have an equipment toolbox with icons corresponding to equipment. The commander can place the equipment icons on a map of the area as part of the response plan. As such, responders or other individuals in possession of the equipment can be directed to bring the equipment to the assigned location. The equipment can also be monitored through the task management system. For example, the commander and/or the task management system can send update requests to individuals in charge of the equipment. The update requests can inquire regarding the remaining battery life of the equipment, the amount of gasoline remaining in a gas tank, whether the equipment is still functional, or any other information regarding the equipment. The commander can use information received in response to the update requests to move equipment around within the area and/or to dispatch additional equipment.

In an operation 995, updates are received and the response plan is revised. The updates can be received from individual responders, team leaders, equipment handlers, bystanders, and/or any other source. The commander can re-assign tasks, re-locate teams/responders, re-locate equipment, etc. based on the received updates. The commander can also use the updates to relay information to only the particular teams/responders that need the information such that all teams/responders are not overwhelmed by massive amounts of irrelevant information. The commander can also use the updates and any other incident information to manage intelligence and ensure that only qualified individuals receive confidential information. Upon the completion of tasks, the commander can also request updates regarding the outcome. The task management system can be used to generate responder specific reports, agency specific reports, task specific reports, and/or equipment specific reports. In alternative embodiments, a response to a complex incident may also be implemented according to any of the other embodiments described with reference to FIGS. 1-9. Similarly, any of the processes described with reference to a complex incident may also be used in responding to incidents which are not considered to be complex.

In an exemplary embodiment, the task management systems described herein can also be used for training responders. Responders can be asked to participate in random or scheduled incident training in which incidents are simulated. The simulations can be monitored, and feedback can be provided to the responder regarding his/her actions. A responder's attendance and/or performance at a simulation can be used to update his/her responder profile. For example, the responder may achieve a certification or award as a result of the training. Performance at simulations can also be used in the ranking algorithm for placing responders in a responder queue in the event of an incident.

In one embodiment, the task management systems described herein can be replicated to form a regional, national, international, and/or global task management system. As such, each task management system may be responsible for a defined geographical area. Further, responders may register with a plurality of task management systems located around a nation or around the world. As such, responders can be called upon as they move about the world. Alternatively, a single task management system may be used to cover an entire nation, etc. As an example, a responder may be accredited by an established local or national body as trained in Advanced Life Saving (ALS), and the responder's accreditation may be recognized by some worldwide body such as the United Nations or World Health Organization. The responder can thus be 'labeled' as an ALS responder wherever he/she travels with his/her mobile device throughout the world. If the responder were visiting a foreign country and an incident were to occur where his/her ALS skills are needed, the responder can be recognized by a task management system in the foreign country, regardless of the fact that he/she is not part of that country's ordinary responder team.

One or more flow diagrams have been used herein. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for responding to incidents, the method comprising:
   receiving incident information corresponding to an incident at an incident location;
   generating an incident scenario based at least in part on the incident information;
   selecting, based on one or more selection criteria, a set of responders out of a database of responder profiles;
   placing said set of responders in a ranked responder queue;
   sending a dispatch request with information about the incident to mobile devices of each one of a pre-defined number of responders from a top of said ranked responder queue;
   receiving, from a particular responder in the ranked responder queue, a refusal response that the particular responder sent in response to the dispatch request;
   based on the refusal response received from said particular responder, (a) removing said articular responder from the set of responders in the ranked responder queue, and (b) moving one or more other responders up in the ranked responder queue.

2. The method of claim 1 wherein the one or more selection criteria comprises incident effectiveness based at least in part on an estimated travel time for the responder to reach the incident location.

3. The method of claim 1 wherein the one or more selection criteria comprises incident effectiveness based at least in part on accumulated experience of the responder.

4. The method of claim 1, wherein at least one responder in the ranked responder queue is associated with a first agency, and at least one other responder in the ranked responder queue is associated with a second agency.

5. The method of claim 1, further comprising:
   receiving an update from the responder, wherein the update comprises additional incident information; and
   modifying the dispatch request based at least in part on the received update.

6. The method of claim 1, wherein receiving the incident information comprises:
   receiving the incident information from a vehicle airbag sensor system or a medical device sensor system.

7. The method of claim 1 further comprising sending the dispatch request to a next responder in the ranked responder queue if no response is received within a predetermined time period from a responder to which the dispatch request has been sent.

8. The method of claim 1 further comprising ranking the plurality of responders in the ranked responder queue based at least in part on their incident effectiveness,
   wherein the incident effectiveness is further based on skills of each of the plurality of responders, qualifications of each of the plurality of responders, or past performance data of each of the plurality of responders.

9. The method of claim 1 further comprising:
   receiving an acceptance from a responder;
   determining whether the responder is a first to arrive at the incident location; and
   receiving a first to arrive report from the responder if the responder is the first to arrive at the incident location.

10. The method of claim 1 wherein the incident information is received as a distress signal from a mobile device of a responder, wherein the distress signal automatically notifies other responders within a predetermined range of the responder of the incident.

11. The method of claim 1, further comprising:
   receiving from a particular responder a distress signal indicating that the particular responder is requesting urgent help at a location of said particular responder;
   upon receiving the distress signal from said particular responder, (A) bypassing dispatcher approval, and (B) automatically dispatching to said location, without waiting for dispatcher approval, one or more responders that are nearest to said location.

12. The method of claim 11, further comprising:
subsequent to automatic dispatching of an initial wave of responders to said location in response to said distress signal, retaking control of a dispatch process by a dispatch center.

13. The method of claim 1, comprising:
defining a responder, to whom the dispatch request was sent, and who ignored the dispatch request for a predefined time period, as a responder that refused the dispatch request; and
automatically dispatching a next responder in the ranked responder queue, wherein qualifications of the next responder are similar to qualifications of the responder that refused the dispatch request.

14. The method of claim 1, comprising:
determining an estimated time at which a certain responder is expected to pass a certain location along its route to the incident location;
tracking a progress of said certain responder towards the incident location;
if said certain responder does not reach said certain location within said estimated time, sending the dispatch request to another responder in the ranked responder queue.

15. The method of claim 14, wherein determining the estimated time to pass said certain location is based, at least, on whether or not said certain responder is able to disobey traffic laws.

16. A task management system comprising:
a central server configured to communicate with a plurality of mobile devices of responders;
a responder database to store responder profiles;
a scenario analysis engine to generate an incident scenario based at least in part on received incident information corresponding to an incident at an incident location,
a dispatch engine
(A) to select, based on one or more selection criteria, a set of responders from the database of responder profiles;
(B) to place said set of responders in a ranked responder queue; to send a dispatch request with information about the incident to mobile devices of each one of a predefined number of responders from a top of said ranked responder queue;
(C) to receive, from a particular responder in the ranked responder queue, a refusal response that the particular responder sent in response to the dispatch request;
(D) based on the refusal response received from said particular responder, (a) removing said particular responder from the set of responders in the ranked responder queue, and (b) moving one or more other responders up in the ranked responder queue.

17. The task management system of claim 16, further comprising a dispatcher interface for interacting with a dispatcher, wherein the dispatcher interface allows the dispatcher to modify the dispatch request based on an update received from one or more responders.

18. The task management system of claim 16 wherein each responder profile stored in the responder database comprises at least one of a skill of the responder, a qualification of the responder, or past performance data corresponding to the responder.

19. The task management system of claim 16, further comprising an agency integration engine to provide status information to an agency with which the responder is associated, wherein the status information includes a role of the responder in responding to the incident.

* * * * *